US008601232B2

(12) United States Patent
Kato

(10) Patent No.: US 8,601,232 B2
(45) Date of Patent: Dec. 3, 2013

(54) MEMORY MANAGEMENT DEVICE, MEMORY MANAGEMENT METHOD, MEMORY MANAGEMENT PROGRAM, COMPUTER-READABLE RECORDING MEDIUM RECORDING MEMORY MANAGEMENT PROGRAM AND INTEGRATED CIRCUIT

(75) Inventor: Kazuomi Kato, Kanagawa (JP)

(73) Assignee: Panasonic Corporation, Osaka (JP)

( * ) Notice: Subject to any disclaimer, the term of this patent is extended or adjusted under 35 U.S.C. 154(b) by 177 days.

(21) Appl. No.: 13/387,000

(22) PCT Filed: Mar. 31, 2011

(86) PCT No.: PCT/JP2011/001946
§ 371 (c)(1),
(2), (4) Date: Jan. 25, 2012

(87) PCT Pub. No.: WO2011/151963
PCT Pub. Date: Dec. 8, 2011

(65) Prior Publication Data
US 2012/0124320 A1    May 17, 2012

(30) Foreign Application Priority Data
May 31, 2010   (JP) ................................ 2010-124410

(51) Int. Cl.
*G06F 12/00*    (2006.01)
(52) U.S. Cl.
USPC ............ 711/170; 711/151; 711/152; 711/154
(58) Field of Classification Search
USPC .................... 711/151, 152, 154, 170
See application file for complete search history.

(56) References Cited

U.S. PATENT DOCUMENTS 6,038,571 A     3/2000   Numajiri et al.
8,341,348 B2 *  12/2012  Yoshii et al. .................. 711/113
(Continued)

FOREIGN PATENT DOCUMENTS

JP     9-212416      8/1997
JP     2000-215099   8/2000
(Continued)

OTHER PUBLICATIONS

International Search Report issued May 31, 2011 in International (PCT) Application No. PCT/JP2011/001946.

*Primary Examiner* — John Lane
(74) *Attorney, Agent, or Firm* — Wenderoth, Lind & Ponack, L.L.P.

(57) ABSTRACT

Available capacity of a specific memory block is secured as much as possible. A termination candidate process selection unit (204) selects, for each of a plurality of memory blocks, a plurality of processes as a termination candidate process group, a termination process decision unit (206) determines whether or not the selected termination candidate process group is to be terminated with priority over a currently held termination candidate process group, a process group termination possibility determination unit (205) determines whether of not the termination candidate process group determined to be terminated can be terminated, and the termination process decision unit (206) rewrites the currently held termination candidate process group to the termination candidate process group determined to be able to be terminated, and decides the currently held termination candidate process group as a process to be terminated when selection of a termination candidate process group is ended for all the memory blocks.

8 Claims, 12 Drawing Sheets

(56) References Cited

U.S. PATENT DOCUMENTS

| | | |
|---|---|---|
| 2005/0235094 A1 | 10/2005 | Sawada |
| 2006/0015698 A1* | 1/2006 | Kim et al. ............... 711/162 |
| 2006/0282637 A1* | 12/2006 | Yamauchi et al. ......... 711/170 |
| 2011/0191447 A1* | 8/2011 | Dazzi et al. ............... 709/219 |
| 2011/0231605 A1* | 9/2011 | Ogawa et al. ............. 711/114 |

FOREIGN PATENT DOCUMENTS

| | | |
|---|---|---|
| JP | 2000-293386 | 10/2000 |
| JP | 2005-11434 | 1/2005 |
| JP | 2005-196343 | 7/2005 |
| JP | 2005-301801 | 10/2005 |
| JP | 2007-86909 | 4/2007 |

* cited by examiner

MEMORY MANAGEMENT DEVICE, MEMORY MANAGEMENT METHOD, MEMORY MANAGEMENT PROGRAM, COMPUTER-READABLE RECORDING MEDIUM RECORDING MEMORY MANAGEMENT PROGRAM AND INTEGRATED CIRCUIT

TECHNICAL FIELD

The present invention relates to a memory management device, a memory management method, a memory management program, a computer-readable recording medium recording a memory management program, and an integrated circuit for managing memories consumed by a plurality of programs in an information processor where a plurality of programs can run. More particularly, it relates to a memory management device, a memory management method, a memory management program, a computer-readable recording medium recording a memory management program, and an integrated circuit for properly releasing memories consumed by programs when the available capacity of the memory and the program have some correspondence in an information processor.

BACKGROUND ART

In an information processing system where a plurality of programs can run, that is, an information processing system which can execute by multi-tasking or in multi-processing, there is a prior art for securing the available capacity of a memory of the information processing system by terminating a running program whereby a memory consumed by the program is released.

For example, Patent Literature 1 discloses a conventional technology for releasing memory by selecting a program to be terminated based on an execution priority being set in the program, and a memory size consumed by the program.

In concrete terms, when an available capacity of a memory of an information processing system becomes a predetermined value or less, the operating system (OS) enables execution of the main memory release process. For example, if an available capacity of the memory is insufficient to startup a new program as a process, the main memory release process is activated.

In the main memory release process, a low priority process is selected out of the processes developed in the main memory, referring to the process management information managed by the OS, and the memory consumed by the selected process is released. This allows avoiding a state where a new high priority process cannot be started up because of a low priority process in-execution.

However in the case of the conventional configuration, a memory volume used by each process is stored in the process management information managed by the OS, but the location of the memory that each process is using is unknown. There is a memory where the power supply can be managed in block units. This kind of memory can supply power for each chip of the memory or for each bank in the memory. In the case of an information processing system which dynamically allocates memory, a memory area to be used for a process to run is normally allocated to a plurality of memory blocks, such as a plurality of memory chips or a plurality of memory banks. If the conventional configuration is used, it is unknown which location of a memory is being used by each process. Hence it is unknown how much of an area of the memory is released if the selected process is terminated.

In the case of the prior art, it is assumed that if memory is insufficient when a new process is started up, a memory allocated to a low priority process is released, and the released memory is used immediately. Therefore there is no need to know which memory block the process is using.

However in some cases, the user may want to shut OFF the power supply to some memory blocks out of a plurality of memory blocks, such as a plurality of memory chips or a plurality of memory banks, to implement power saving mode of the information processor. If the power supply to a memory block is shut OFF, data on this memory block is erased, so the data must be saved according to a proper procedure.

In the case of Codec which compresses or decompresses image data, it is desirable to use a continuous area in memory. However if a plurality of memory block areas are allocated to one process, each memory block area is released respectively even if this process is terminated, which makes it difficult to secure a continuous area.

With some recent information processors, each process and available capacity of memory is corresponded, and a process that can be terminated is specified according to the available capacity of the memory. With the conventional configuration, the consuming state of a memory in the information processing system cannot be known. Therefore it cannot be determined whether a process selected to be terminated can really be terminated depending on the current consuming state of the memory of the information processing system.

CITATION LIST

Patent Literature

Patent Literature 1: Japanese Patent Application Laid-Open No. 2000-215099

SUMMARY OF INVENTION

With the foregoing in view, it is an object of the present invention to provide a memory management unit which can secure available capability of a specific memory block as much as possible, a memory management method, a memory management program, a computer-readable recording method recording the memory management program, and an integrated circuit.

A memory management device according to one aspect of the present invention is a memory management device for managing a memory which includes a plurality of memory blocks, comprising: a process allocation memory management unit which manages the allocation size of a plurality of memory blocks allocated to each of a plurality of processes used in an information processing system which is capable of executing the processes, in memory block units for each of the processes; a system memory management unit which manages a memory available capacity of all the plurality of memory blocks; a termination candidate process selection unit which, upon receiving a memory release request for releasing the memory from the information processing system, extracts a plurality of processes allocated to each of the plurality of memory blocks in descending order of the allocation size, based on the allocation size managed by the process allocation memory management unit, and selects the extracted plurality of processes as a termination candidate process group for each of the plurality of memory blocks; a preferential termination determination unit which determines whether or not the termination candidate process group selected by the termination candidate process selection unit is to be terminated with priority over a currently held termination candidate process group; a process group termination possibility determination unit which rearranges, according to the priority, the sequence in the termination candidate process group which has been selected by the termination candidate process selection unit and determined to be terminated with priority by the preferential termination determination unit, and which determines whether or not the rearranged termination candidate process group is capable of terminating based on the memory available capacity of all the plurality of memory blocks managed by the system memory management unit; and a termination process decision unit which rewrites the currently held termination candidate process group to the termination candidate process group determined to be able to be terminated by the process group termination possibility determination unit, and decides the currently held termination candidate process group as the process group to be terminated when selection of a termination candidate process group is ended for all the memory blocks.

According to this configuration, an allocation size of a plurality of memory blocks allocated to a process used in an information processing system, which is capable of executing a plurality of processes, is managed in memory block units for each process. Also the memory available capacity of all the plurality of memory blocks is managed. When a memory release request for releasing the memory is received from the information processing system, a plurality of processes allocated for each of the plurality of memory blocks are extracted in descending order of the allocated size, based on the managed allocation size, and the extracted plurality of processes are selected as a termination candidate process group for each of the plurality of memory blocks. Then it is determined whether or not the selected termination candidate process group is to be terminated with priority over a currently held termination candidate process group. The sequence in the termination candidate process group which is determined to be terminated with priority is rearranged according to the priority, and it is determined whether or not the rearranged termination candidate process group is capable of terminating based on the memory available capacity of all the plurality of memory blocks being managed. When the process group of currently held termination candidate is rewritten to the termination candidate process group determined to be able to be terminated and selection of a termination candidate process group is ended for all the memory blocks, the currently held termination candidate process group is determined as a process group to be terminated.

According to the present invention, a termination candidate process group is selected for each of the plurality of memory blocks, whether or not the selected termination candidate process group can be terminated is determined, and the process group which is determined to be able to be terminated is terminated, hence available capacity of a specific memory block can be secured as much as possible.

DESCRIPTION OF EMBODIMENTS

Embodiments of the present invention will now be described with reference to the drawings. The following embodiments are examples of carrying out the present invention, and are not for limiting the technical scope of the present invention.

Figure 1:
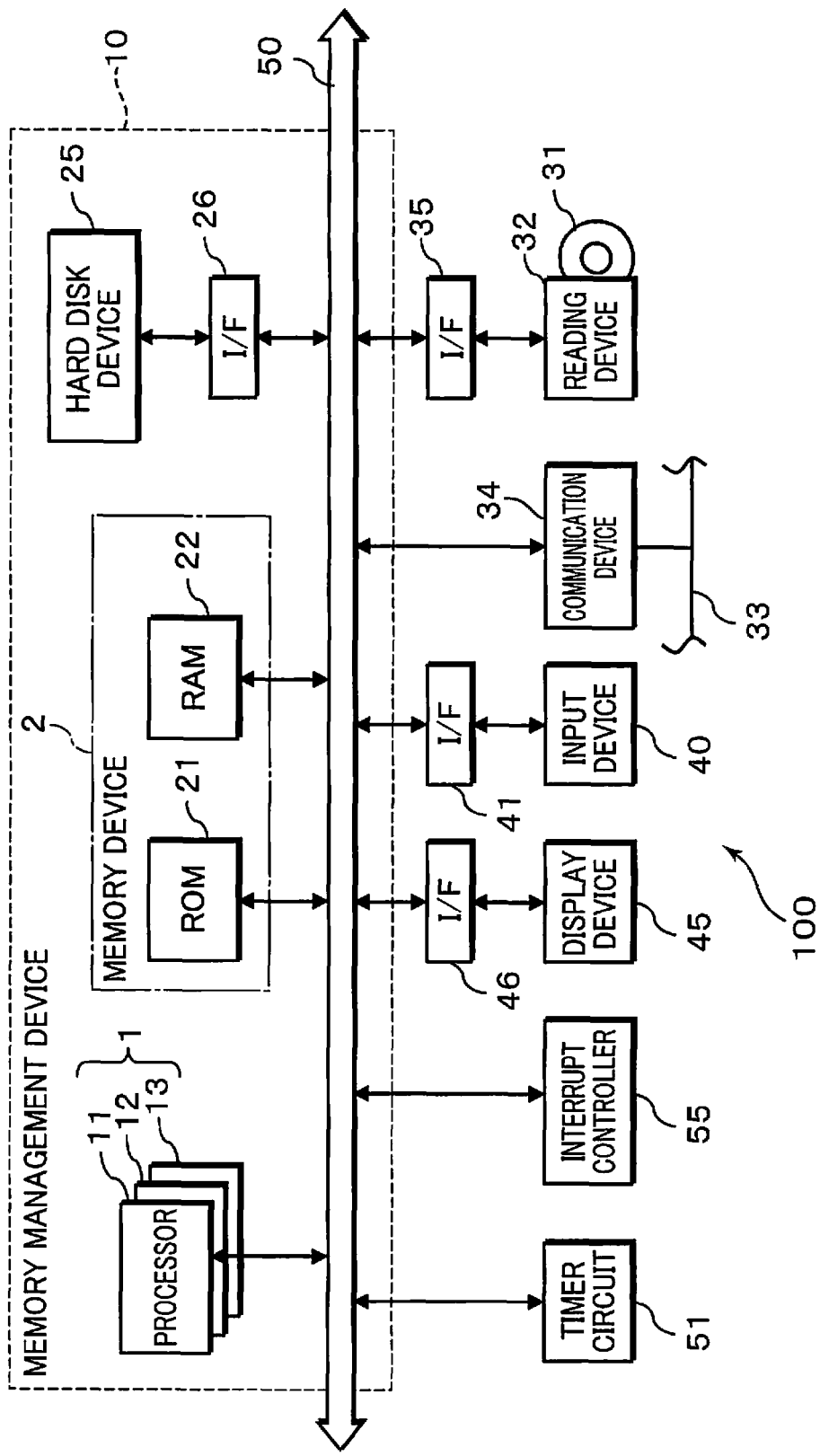
FIG. 1 is a diagram depicting a configuration of an information processor according to an embodiment of the present invention.

FIG. 1 is a diagram depicting a configuration of an information processor according to an embodiment of the present invention. This information processor 100 can be used alone by a user, but may be integrated into various electric apparatuses. A typical example of the information processor 100 is a general computer, such as a PC (Personal Computer). The information processor 100 may be a PDA (Personal Digital Assistance) or a portable communication terminal, such as a portable telephone. The information processor 100 may also be a TV, hard disk recorder, various disk recorders which records information on a DVD or Blu-Ray disk, various disk players which regenerate information for a DVD or Blu-Ray disk, or car navigation systems.

The information processor 100 has a processor 1, a memory device 2, a communication device 34, an input device 40, a display device 45, a timer circuit 51 and an interrupt controller 55. The processor 1 is typically a processing unit, such as a CPU (Central Processing Unit), a processor for media processing or graphic processing, or a DSP (Digital Signal Processor). The processor 1, the memory device 2, the communication device 34, the input device 40, the display device 45, the timer circuit 51 and the interrupt controller 55 are interconnected via a bus line 50. If necessary, a hard disk device 25 and a reading device 32 can be connected to the bus lines 50. The hard disk device 25, the reading device 32, the input device 40 and the display device 45 are connected to the bus line 50 via I/F (interfaces) 26, 35, 41 and 46 respectively.

The processor 1 may be constituted by a single processor or may be constituted by a plurality of processors. For example, the information processor 100 has a plurality of processors 11, 12, 13, . . . .

The memory device 2 has a ROM (Read Only Memory) 21 and a RAM (Random Access Memory) 22. The ROM 21 stores computer programs for specifying operation of the processor 1 and data. The computer programs and data may be stored in the hard disk device 25.

The processor 1 executes processing specified by the computer programs while writing the computer programs and data stored in the ROM 21 or the hard disk device 25 to the RAM 22 when necessary. The RAM 22 also functions as a media for temporarily storing data which is generated as the processor 1 executes processing. The ROM 21 includes a nonvolatile memory and storage media which can be written to, and can hold stored content even if power is turned OFF, such as a flash ROM. The RAM 22 includes a volatile memory and storage media which cannot hold the stored content once the power is turned OFF.

The hard disk device 25 writes computer programs and data to an enclosed hard disk, which is not illustrated, and reads computer programs and data from the hard disk. The reading device 32 reads computer programs or data recorded in the recording media 31, such as CDs, DVDs or memory cards. The communication device 34 exchanges computer programs or data with the outside via a communication line 33, such as a telephone line, a network line, a radio or an infrared communication.

The input device 40 receives input of data or the like by user operation. The input device 40 is, for example, a keyboard arrayed on a PDA, input buttons arrayed on a portable telephone, and a removable mouse or a removable keyboard. The display device 45 displays data and images on the screen, and outputs data as sound. The display device 45 is, for example, an LCD (Liquid Crystal Display), a cathode ray tube or a speaker.

The timer circuit 51 outputs a time interrupt signal at a predetermined cycle. The interrupt controller 55 relays an interrupt request signal, transmitted from this time circuit 51, the input device 40, the processor 1, the communication device 34 as a network device, the hard disk device 25 and reading device 32, to the processor 1. A priority level is assigned to an interrupt request from each device. If interrupts are generated from plurality of devices at ther same time, the interrupt controller 55 has a function to arbitrate these requests according to the priority level.

As mentioned above, the information processor 100 is constructed as a computer. The computer programs can be supplied via the ROM 21, the hard disk device 25 or the recording media 31, such as a flexible disk, which is not illustrated, and a CD-ROM, or can be supplied via transmission media, such as the communication line 33. For example, a computer program recorded in the computer-readable recording media 31 (CD-ROM) can be read via the reading device 32 connected to the information processor 100. The RAM 22 or the hard disk device 25 can store the read computer program.

If a computer program is supplied from the ROM 21, the processor 1 can execute processing according to the computer program by mounting the ROM 21 on the information processor 100. A computer program supplied via the transmission media, such as the communication line 33, is received via the communication device 34, and is stored in the RAM 22 or the hard disk device 25, for example. The transmission media is not limited to a cable transmission media, but may be wireless transmission media. The transmission media is not only a communication line, but also includes a relay device which relays the communication line, such as a router.

The core of this memory management function is normally stored in the memory device 2 or the hard disk device 25, and is executed in cooperation with the processor 1, whereby the memory management device 10 is implemented. The memory management device 10 comprises at least one processor and a memory device. The information processing system comprises at least one processor and a memory device. The information processing system executes a plurality of processes. For the plurality of processes, predetermined areas in the memory device 2 are allocated, and the information processing system executes the plurality of processes using these predetermined areas.

Figure 2:
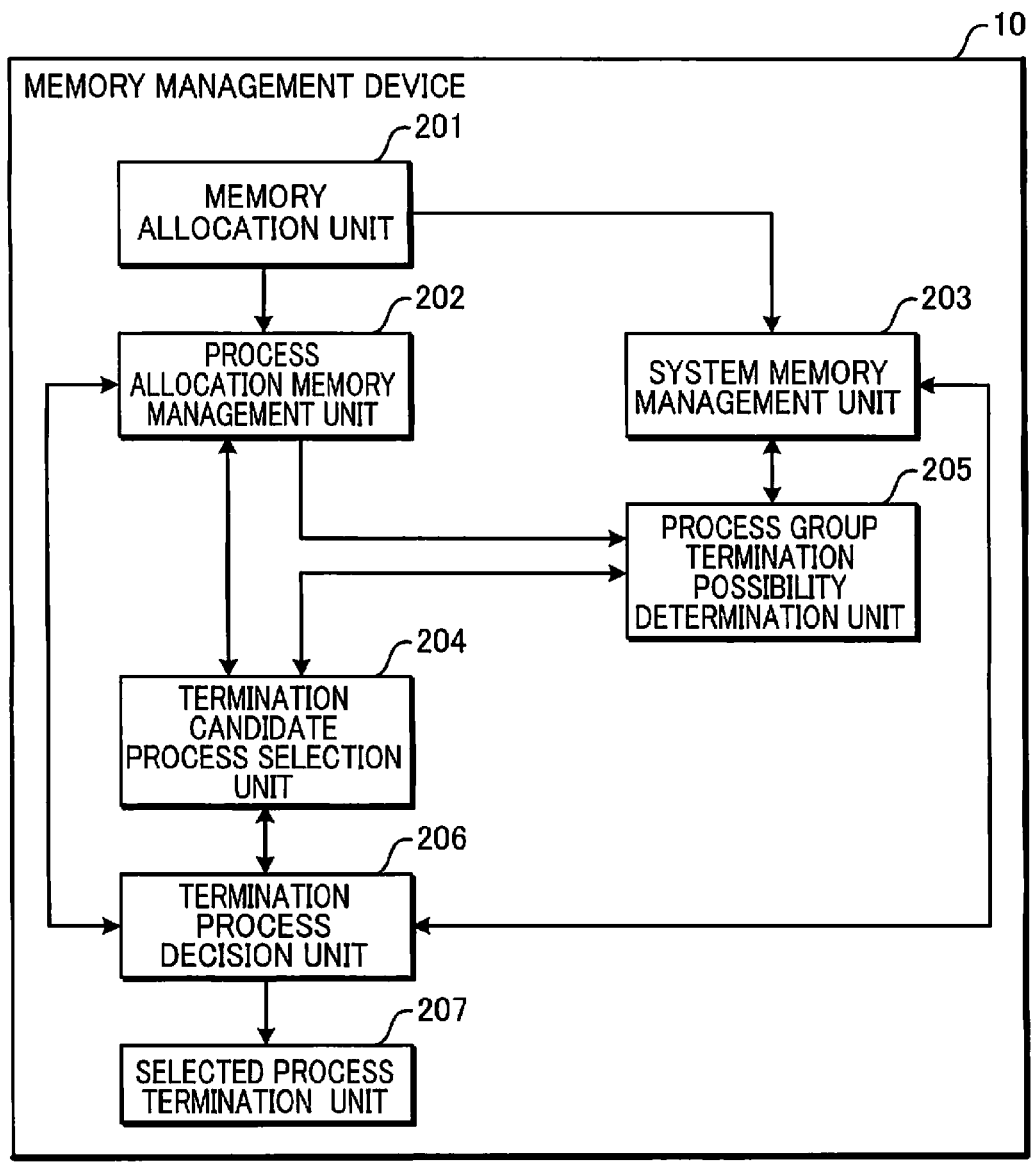
FIG. 2 is a block diagram depicting a configuration of a memory management device according to an embodiment of the present invention.

FIG. 2 is a block diagram depicting a configuration of the memory management device according to an embodiment of the present invention. The memory management device 10 is implemented by the processor 1 and an external memory operating in tandem. The external memory is typically the ROM 21 or the RAM 22 included in the memory device 2 shown in FIG. 1, the hard disk device 25 or the recording media 31, which is read by the reading device 32.

The memory management device 10 has a memory allocation unit 201, a process allocation memory management unit 202, a system memory management unit 203, a termination candidate process selection unit 204, a process group termination possibility determination unit 205, a termination process decision unit 206 and a selected process termination unit 207.

When a memory allocation request is received from the information processing system, the memory allocation unit 201 allocates an open area of the memory (typically RAM 22) managed by the information processing system to a process. A process or a task is a name of an execution unit of a program. The process uses the memory allocated by the memory allocation unit 201 for storing an execution code or data of each process.

The RAM 22 may be constituted by a plurality of memory blocks which can manage power supply independently. For example, the RAM 22 may be a plurality of memory chips which can manage power supply independently. The RAM 22 may also be a single memory chip, and inside the chip may be constituted by a plurality of memory block units which can manage power supply independently. In other words, power is supplied individually to the plurality of memory blocks, and ON/OFF of the power supply can be switched for each memory block.

When a memory is allocated to a process, the memory allocation unit 201 notifies the process allocation memory management unit 202 with information on the process to which the memory block is allocated, information on the memory block to which the process is allocated, and information on the size allocated to each memory block. The memory allocation unit 201 also notifies the system memory management unit 203 with information on the memory block to which the process is allocated, and information on the size allocated to each memory block.

The process allocation memory management unit 202 manages the allocation size of a plurality of memory blocks allocated to each of a plurality of processes used in the information processing system which is capable of executing the processes, in memory block units for each process. The process allocation memory management unit 202 stores memory allocation information, which indicates a size allocated to each memory block, for each process. When information on the memory allocation (information on the process to which the memory block is allocated, information on the memory block to which the process is allocated, and information on the size allocated to each memory block) is acquired from the memory allocation unit 201, the process allocation memory management unit 202 updates the memory allocation information on the corresponding process.

The system memory management unit 203 manages the memory available capacity of all the plurality of memory blocks and the memory available capacity of each of the plurality of memory blocks respectively. The system memory management unit 203 stores the memory available capacity of all the plurality of memory blocks and the memory available capacity of each of the plurality of memory blocks. When the information on the memory allocation (information on the memory block to which the process is allocated and the information on the size allocated to each memory block) is acquired from the memory allocation unit 201, the system memory management unit 203 updates the memory available capacity of all the plurality of memory blocks and a memory available capacity of each of the memory blocks based on the acquired information.

The termination candidate process selection unit 204 operates when a memory release request for releasing the memory is received from the information processing system. The memory release request includes a memory available capacity requested by the information processing system, and is used for securing a predetermined available capacity from an entire memory which consists of a plurality of memory blocks.

The termination candidate process selection unit 204 selects a termination candidate process in order to secure the memory available capacity requested from the information processing system. The termination candidate process selection unit 204 selects a termination candidate process so that a maximum area can be released from a predetermined memory block out of the plurality of memory blocks. For this, the termination candidate process selection unit 204 acquires information on a current memory block and size allocated for each process from the process allocation memory management unit 202.

When the memory release request for releasing memory is received from the information processing system, the termination candidate process selection unit 204 extracts a plurality of processes allocated to each of the plurality of memory blocks in descending order of the allocation size, based on the allocation size managed by the process allocation memory management unit 202, and selects a plurality of extracted processes as a termination candidate process group for each of the plurality of memory blocks.

The termination candidate process selection unit 204 selects a termination candidate process for each memory block and transfer the information to the process group termination possibility determination unit 205. The termination candidate process selection unit 204 inquires to the process group termination possibility determination unit 205 whether of not the selected plurality of processes can be terminated under the current state of the information processing system.

When the plurality of processes are received from the termination candidate process selection unit 204, the process group termination possibility determination unit 205 receives information on current memory available capacity from the system memory management unit 203. Furthermore, based on the memory available capacity and termination possibility conditions of each process, which are specified in the information processing system, the process group termination possibility determination unit 205 adjusts the process termination sequence received from the termination candidate process selection unit 204.

When the termination candidate process group selected by the termination candidate process selection unit 204 is acquired, the process group termination possibility determination unit 205 acquires the memory available capacity of all the plurality of memory blocks from the system memory management unit 203, rearranges the termination candidate process group in the sequence of terminating, based on the relationship of the conditions of the memory available capacity of all the plurality of memory blocks and the process that can be terminated under these conditions, and determines whether the rearranged process group can be terminated. The process group termination possibility determination unit 205 notifies the termination possibility determination result information to the termination candidate process selection unit 204, and if there is a process that cannot be terminated, the process group termination possibility determination unit 205 notifies the termination candidate process selection unit 204 of this process which cannot be terminated.

When the notice that all of the selected process group can be terminated is received from the process group termination possibility determination unit 205, the termination candidate process selection unit 204 transfers the selected process group and the memory allocation information to the termination process decision unit 206. Then the termination candidate process selection unit 204 selects the termination candidate process for other memory blocks in the same manner.

When the termination candidate process group and the memory allocation information are received from the termination candidate process selection unit 204, the termination process decision unit 206 determines whether or not the received termination candidate process group is to be terminated with priority over the termination candidate process group for another memory block received from the termination candidate process selection unit 204 thus far, and transmits the notice to indicate whether this termination candidate process group should be the termination candidate to the termination candidate process selection unit 204. When the termination process group is acquired from the termination candidate process selection unit 204 for all the memory blocks respectively, the termination process decision unit 206 decides the process group which finally becomes the candidate as the process to be terminated, and notifies the process group to be terminated to the selected process termination unit 207.

The termination process decision unit 206 determines whether or not the termination candidate process group selected by the termination candidate process selection unit 204 is to be terminated with priority over a currently held termination candidate process group.

The termination process decision unit 206 determines whether or not the termination candidate process group selected by the termination candidate process selection unit 204 is to be terminated with priority over a currently held termination candidate process group, based on a size relationship between the available capacity of the memory block which can be secured by terminating the termination candidate process group selected by the termination candidate process selection unit 204, and the available capacity of the memory block which can be secured by terminating the currently held termination candidate process group.

The termination process decision unit 206 also determines whether or not the termination candidate process group selected by the termination candidate process selection unit 204 is to be terminated with priority over a currently held termination candidate process group, based on a size relationship between the number of processes of a plurality of processes constituting the termination candidate process group selected by the termination candidate process selection unit 204, and the number of processes of a plurality of processes constituting the currently held termination candidate process group.

The process group termination possibility determination unit 205 also rearranges, according to the priority, the sequence in the termination candidate process group which has been selected by the termination candidate process selection unit 204, and was determined to be terminated with priority by the termination process decision unit 206, and determines whether or not this rearranged termination candidate process group can be terminated, based on the memory available capacity of all the plurality of memory blocks managed by the system memory management unit 203.

The process group termination possibility determination unit 205 also rearranges the plurality of processes constituting the termination candidate process group selected by the termination candidate process selection unit 204, based on the priority level which is set in advance for each process.

The termination process decision unit 206 rewrites the currently held termination candidate process group to the termination candidate process group determined to be able to be terminated by the process group termination possibility determination unit 205, and decides the currently held termination candidate process group as a process group to be terminated when selection of an termination candidate process group is ended for all the memory blocks.

When the process group to be terminated is received from the termination process decision unit 206, the selected process termination unit 207 transmits an instruction to terminate the corresponding process to the information process system, and the information processing system terminates the corresponding process. Thereby the memory which has been used by the terminated process is released, and the memory available capacity requested by the information processing system is secured.

In the present embodiment, the process allocation memory management unit 202 corresponds to an example of the process allocation memory management unit, the system memory management unit 203 corresponds to an example of the system memory management unit, the termination candidate process selection unit 204 corresponds to an example of the termination candidate process selection unit, the termination process decision unit 206 corresponds to an example of the preferential termination determination unit and the termination process decision unit, and the process group termination possibility determination unit 205 corresponds to an example of the process group termination possibility determination unit.

Figure 3:
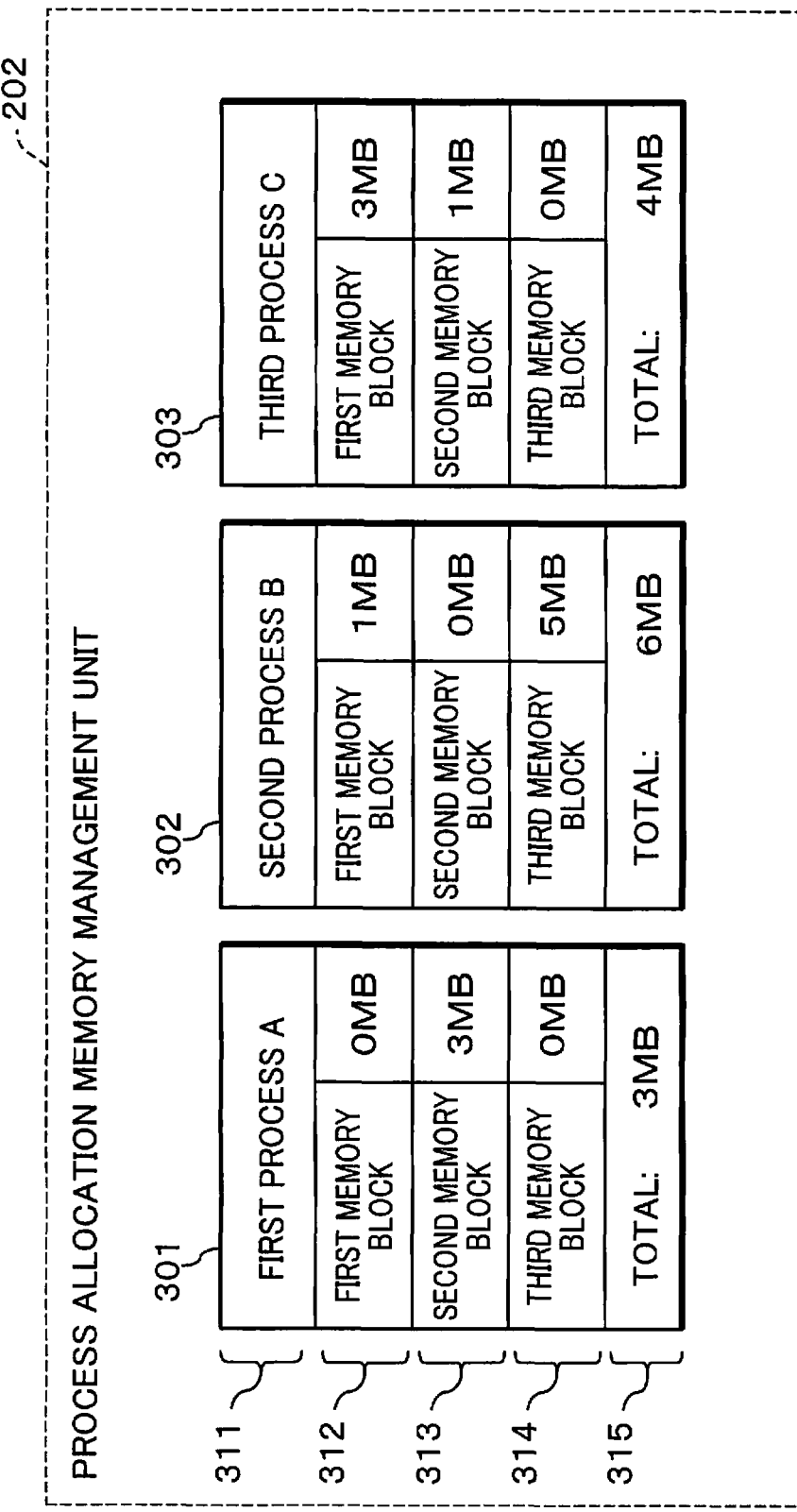
FIG. 3 is a diagram depicting an example of memory allocation information managed by a process allocation memory management unit according to an embodiment of the present invention.

FIG. 3 is a diagram depicting an example of memory allocation information managed by the process allocation memory management unit according to the embodiment of the present invention. In FIG. 3, the memory allocation information 301, 302 and 303 in three processes: first process A, second process B and third process C, are shown as examples.

The memory allocation information 301, 302 and 303 includes process identification information 311, allocation size information 312 and total size information 315. Here the memory allocation information 301 in the first process A will be described.

The process allocation memory management unit 202 manages the process identification information 311 for identifying the process to which the memory allocation information corresponds. The process allocation memory management unit 202 also manages, for each process, the allocation size information 312, 313 and 314, which indicates the allocation size allocated to each of the plurality of memory blocks. The process allocation memory management unit 202 also manages the total size information 315 to indicate the total size of the memory areas allocated to the process. FIG. 3 is just an example of the management format, and the number of processes and the number of memory blocks are not limited to the numbers shown in FIG. 3.

When the information on the memory allocation is received from the memory allocation unit 201, the process allocation memory management unit 202 updates the allocation size information and the total size information of the memory blocks corresponding to the memory allocation information of the corresponding process. For example, a case when the process allocation memory management unit 202 has the memory allocation information shown in FIG. 3, and information that 1 MB is allocated to the third memory block in the first process A, is received from the memory allocation unit 201, will be described.

In this case, the process allocation memory management unit 202 adds 1 MB to the allocation size of the allocation size information 314 corresponding to the third memory block included in the memory allocation information 301 of the corresponding first process A. Due to this, the allocation size information 314 is changed from 0 MB to 1 MB. Then the process allocation memory management unit 202 adds 1 MB to the total size of the total size information 315 included in the memory allocation information 301 of the first process A. Due to this, the total size information 315 is updated from 3 MB to 4 MB.

In the case of an information process system having a virtual address space, a state that does not consume physical memory could occur, even if a memory area is allocated to the virtual address space of the process. Therefore the memory allocation unit 201 may notify the memory allocation information to the process allocation memory management unit 202 and the system memory management unit 203 at a timing of allocating physical memory to the process, that is, at a timing of actually consuming the physical memory.

When a request is received from the termination candidate process selection unit 204, the process allocation memory management unit 202 transfers information to indicate the memory block that each process is allocated to, and the size thereof, to the termination candidate process selection unit 204 based on the memory allocation information shown in the example in FIG. 3.

Figure 4:
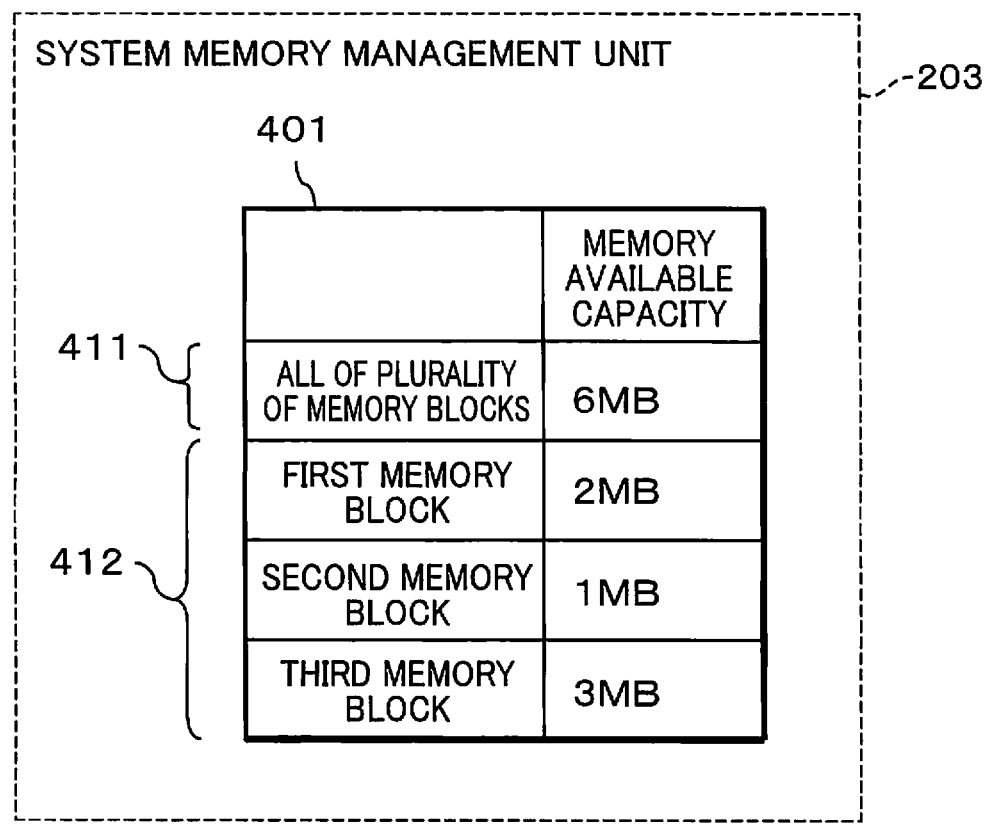
FIG. 4 is a diagram depicting an example of memory available capacity information managed by a system memory management unit according to an embodiment of the present invention.

FIG. 4 is a diagram depicting an example of the memory available capacity information managed by the system memory management unit according to an embodiment of the present invention. The memory available capacity information 401 includes a memory available capacity 411 of all the plurality of memory blocks, and a memory available capacity 412 of each memory block.

When a memory available capacity of all the plurality of memory blocks is requested from the process group termination possibility determination unit 205, the system memory management unit 203 transfers the memory available capacity 411 of all the plurality of memory blocks to the process group termination possibility determination unit 205, based on the memory available capacity information 401. When the memory available capacity of each memory block is requested from the termination process decision unit 206, the system memory management unit 203 transfers the memory available capacity 412 of each memory block to the termination process decision unit 206, based on the memory available capacity information 401.

Figure 5:
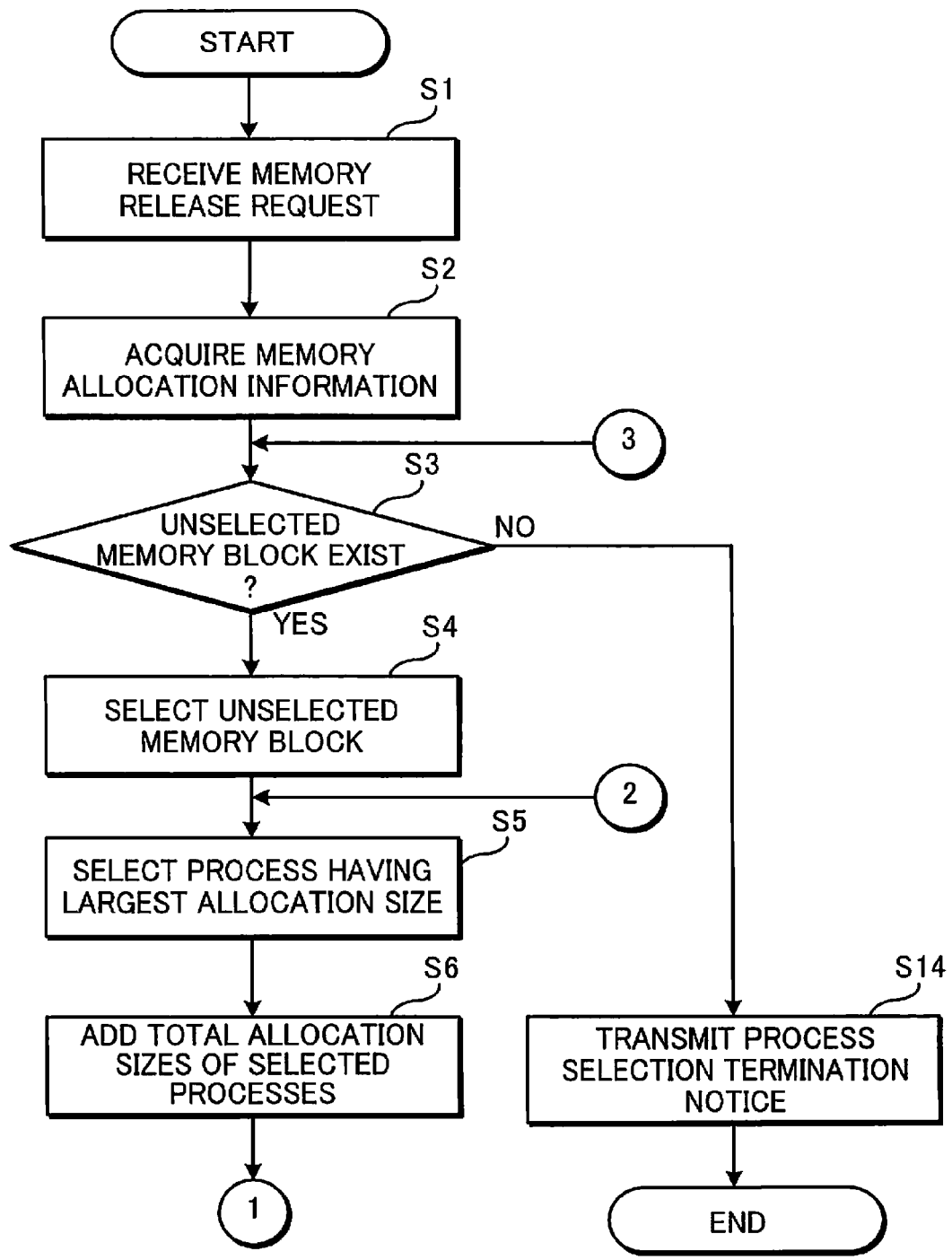
FIG. 5 is a first flow chart depicting an example of a termination candidate process selection unit according to an embodiment of the present invention.
Figure 6:
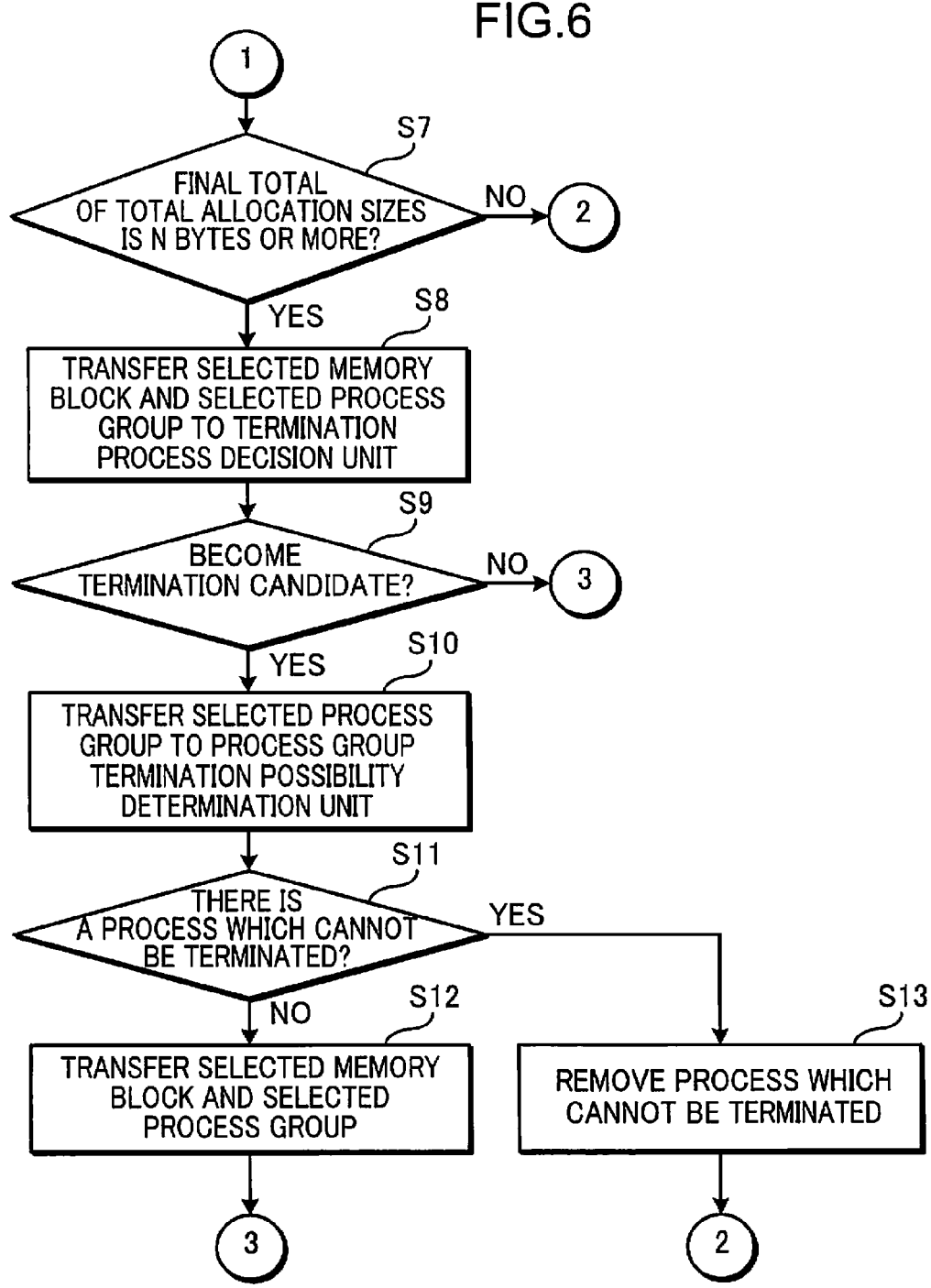
FIG. 6 is a second flow chart depicting an example of the termination candidate process selection unit according to the embodiment of the present invention.

FIG. 5 and FIG. 6 are flow charts depicting an example of the processing of the termination candidate process selection unit according to an embodiment of the present invention.

First the termination candidate process selection unit 204 receives a memory release request to release a memory by terminating a process from the information processing system (step S1). For example, it is assumed that the information processing system requested to release a memory area of which size is N bytes.

Then the termination candidate process selection unit 204 acquires memory allocation information from the process allocation memory management unit 202 (step S2). Thereby the termination candidate process selection unit 204 can acquire the memory allocation information required for selecting a termination candidate process for each memory block.

Hereafter the termination candidate process selection unit 204 selects a termination candidate process for each memory block in order to release a memory area as much as possible from a specified memory block, and evaluates the selected process.

Then the termination candidate process selection unit 204 determines whether or not there is unselected memory blocks, that is, memory blocks which are not selected for the termination candidate process, out of the existing plurality of memory blocks (step S3). Normally if the termination candidate process selection unit 204 has not yet selected a process to be terminated for any memory block, unselected memory blocks always exist.

If it is determined that there are memory blocks which are not selected for a termination candidate process (YES in step S3), the termination candidate process selection unit 204 selects one of the unselected blocks (step S4). The termination candidate process selection unit 204 shifts to a processing to select a process to be terminated, so that a memory area can be released as much as possible from the selected memory block.

Then out of the unselected processes, the termination candidate process selection unit 204 selects a process of which allocation size in the memory block selected in step S4, is the largest (step S5). For example, a case when the termination candidate process selection unit 204 acquires the memory allocation information shown in FIG. 3 from the process allocation memory management unit 202, and the first memory block is selected in step S4, will be described. In this case, the termination candidate process selection unit 204 selects the third process C, of which allocation size is largest in the first memory block, is selected out of the first to third processes, which are not selected.

Then the termination candidate process selection unit 204 adds the process selected in step S5 to the process group to be terminated for the memory block. The termination candidate process selection unit 204 also adds the total allocation size of the process selected in step S5 to the final total of the total allocation sizes of the processes selected thus far (step S6).

Then the termination candidate process selection unit 204 determines whether or not the final total of the total allocation size of each process selected thus far is N bytes or more as requested in step S1 (step S7). If it is determined that the final total of the total allocation size of each selected process is smaller than N bytes (NO in step S7), processing returns to the processing in step S5, and the termination candidate process selection unit 204 selects the next unselected process. If there is no more unselected process in the state where the final total of the total allocation size of each selected process is not N bytes or more, that is, if the memory size requested from the information processing system cannot be released, the termination candidate process selection unit 204 must stop processing, and return an error to the information processing system. In the present description, the error processing is not included in the flow charts shown in FIG. 5 and FIG. 6 in order to describe the major functions of the termination candidate process selection unit 204.

If it is determined that the final total of the total allocation size of each selected process is N bytes or more (YES in step S7), the termination candidate process selection unit 204 transfers the information on the selected memory block and information on the selected process group to the termination process decision unit 206 (step S8). The termination process decision unit 206 compares the process group selected for the memory block selected this time and the process group selected thus far for the same memory block as the memory block selected this time, and checks if the process group selected for the memory block selected this time can be the termination candidate. The processing of the termination process decision unit 206 will be described later. In concrete terms, the termination candidate process selection unit 204 transfers information on the selected memory block and information on the selected process group to the termination process decision unit 206.

Then the termination candidate process selection unit 204 receives the information to indicate whether or not the transferred process group becomes a termination candidate from the termination process decision unit 206, and determines whether the transferred process group becomes a termination candidate or not, based on the received information (step S9). If it is determined that the transferred process group does not become a termination candidate (NO in step S9), the termination candidate process selection unit 204 discards the process group selected for the memory block selected in step S4, and returns to the processing in step S3.

If it is determined that the transferred process group becomes a termination candidate (YES in step S9), on the other hand, the termination candidate process selection unit 204 transfers the process group to the process group termination possibility determination unit 205 in a format with which the selected sequence can be known (step S10). Thereby processing moves to the processing to inquire of the process group termination possibility determination unit 205 whether the selected process group can actually be terminated. The process of the process group termination possibility determination unit 205 will be described later.

Then the termination candidate process selection unit 204 receives the information to indicate whether there is a process which cannot be terminated in the transferred process group, from the process group termination possibility determination unit 205, and determines whether there is a process which cannot be terminated in the selected process group, based on the received information (step S11). If it is determined that there is no process which cannot be terminated in the selected process group (NO in step S11), the termination candidate process selection unit 204 transfers information to indicate the selected memory block and information to indicate the process group of which selection is determined to the termination process decision unit 206, along with a notice to notify that the selection is determined (step S12), and returns to the processing in step S3.

If it is determined that there is a process which cannot be terminated in the transferred process group, on the other hand (YES in step S11), the termination candidate process selection unit 204 removes the process which cannot be terminated out of the selected process group (step S13), and returns to the processing in step S3.

If the processing is completed for all the memory blocks and it is determined that there is no memory block which does not select the termination candidate process in step S3 (NO in step S3), the termination candidate process selection unit 204 transmits a process selection termination notice, to indicate that selection of a termination candidate process terminated, to the termination process decision unit 206 (step S14), and completes processing.

Figure 7:
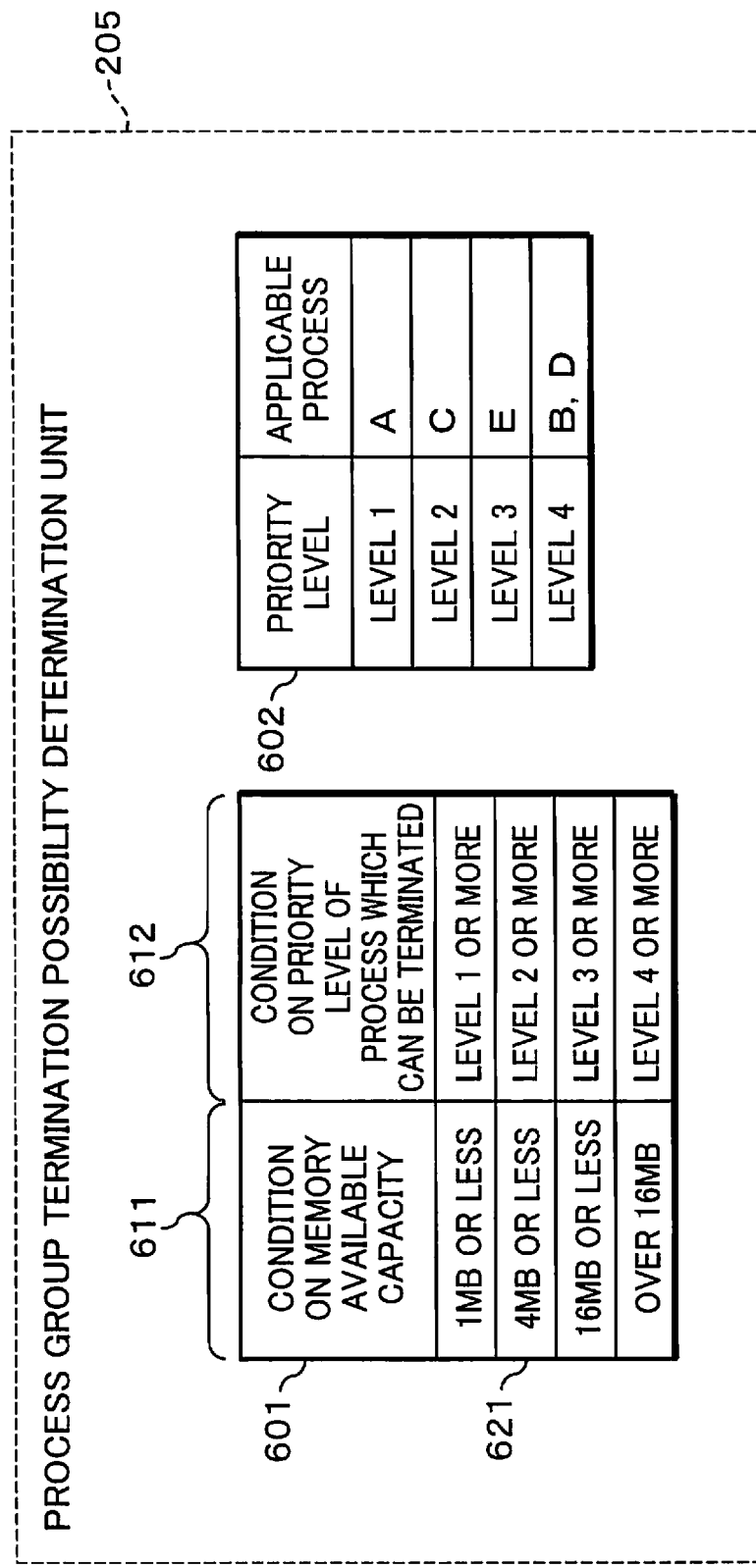
FIG. 7 is a diagram depicting an example of termination possibility determination conditions managed by a process group termination possibility determination unit according to an embodiment of the present invention.

Now the memory available capacity and conditions on termination possibility of each process, managed by the process group termination possibility determination unit 205, will be described. FIG. 7 is a diagram depicting an example of the termination possibility determination conditions managed by the process group termination possibility determination unit according to the embodiment of the present invention. The process group termination possibility determination unit 205 specifies the possibility of terminating a process by the memory available capacity and priority level of the process according to the memory available capacity. This is for assigning criticality to the process to be terminated, and the degree of urgency on the system is known based on the memory available capacity, so that a process having high criticality is terminated only when the degree of urgency is high.

In the case of the example in FIG. 7, the process group termination possibility determination unit 205 stores the termination possibility level management information 601, which corresponds the conditions on memory available capacity of all the plurality of memory blocks 611 with conditions on the priority level of a process which can be terminated 612, and the process level management information 602 which corresponds a priority level value of the process with a process corresponding to the priority level value. The termination possibility determination conditions include the termination possible level management information 601 and the process level management information 602. The example in FIG. 7 shows that the priority level is higher, that is, the termination conditions are more strict, as the value of priority level is smaller.

In the conditions on the memory available capacity 611 of the termination possible level management information 601, the conditions on the memory available capacity of all the plurality of memory blocks can be set in stages, and in the conditions on the priority level 612, the conditions on the priority level of the process which can be terminated upon matching with conditions on the memory available capacity can be set.

In concrete terms, if the current memory available capacity of all of a plurality of memory blocks is 3 MB (Mega Bytes), this memory available capacity matches with the memory available capacity conditions 611, that is, "4 MB or less" (item 621 in FIG. 7), and the priority level of the process that can be terminated is "level 2 or more" according to the termination possible level management information 601. According to the process level management information 602, the processes of which priority level is level 2 or more are the second process B, the third process C, the fourth process D and the fifth process E. Therefore processes which can be terminated are the second process B, the third process C, the fourth process D and the fifth process E, and the first process A cannot be terminated.

The configurations of the termination possible level management information 601 and the process level management information 602 shown in FIG. 7 are just examples, and can be any information if a process which can be terminated can be managed according to the memory available capacity of all the plurality of memory blocks.

Figure 8:
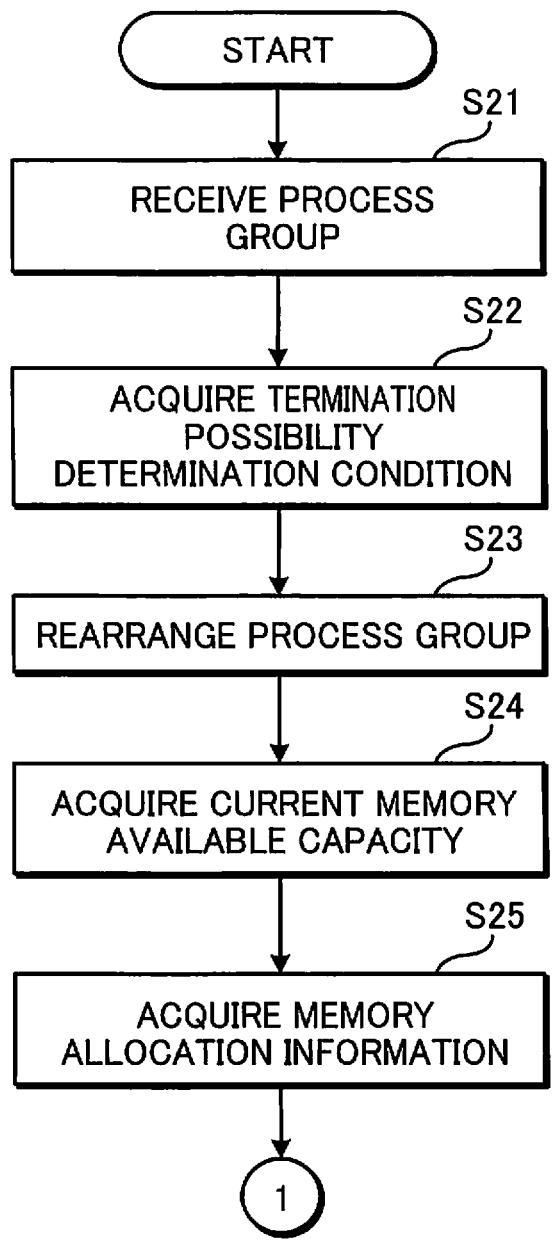
FIG. 8 is a first flow chart depicting an example of the processing by the process group termination possibility determination unit according to an embodiment of the present invention.
Figure 9:
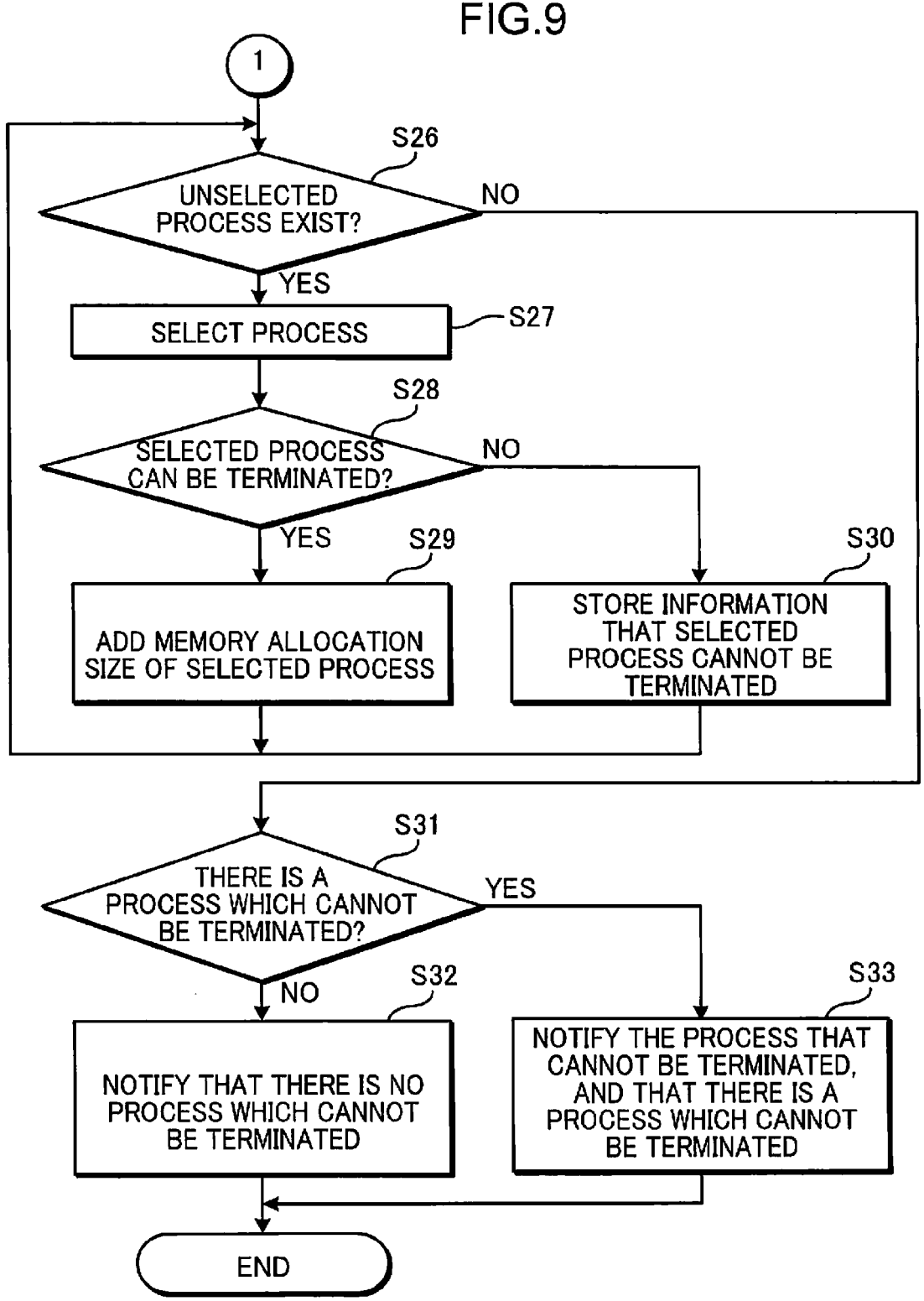
FIG. 9 is a second flow chart depicting an example of the processing by the process group termination possibility determination unit according to the embodiment of the present invention.

Now the processing of the process group termination possibility determination unit 205 will be described. FIG. 8 and FIG. 9 are flow charts depicting an example of processing of the process group termination possibility determination unit according to an embodiment of the present invention.

First the process group termination possibility determination unit 205 receives information on a selected process group from the termination candidate process selection unit 204 (step S21).

Then the process group termination possibility determination unit 205 acquires the termination possibility determination conditions shown in FIG. 7 as an example (step S22).

Then the process group termination possibility determination unit 205 rearranges the process group selected by the termination candidate process selection unit 204 in the sequence of higher priority, that is, in the sequence of stricter termination conditions (step S23). Here if the termination conditions of a plurality of processes are the same, the process group termination possibility determination unit 205 can hold the processes in the sequence of acquisition from the termination candidate process selection unit 204.

In concrete terms, if the process group termination possibility determination unit 205 acquires a process group {second process B, fourth process D, third process C and first process A} from the process group termination possibility determination unit 205, and has the termination possibility determination conditions shown in FIG. 7 as an example, the process group termination possibility determination unit 205 rearranges the process group in the sequence of {first process A, third process C, second process B and fourth process D}.

Then the process group termination possibility determination unit 205 acquires the current memory available capacity of all the plurality of memory blocks from the system memory management unit 203 (step S24). Then the process group termination possibility determination unit 205 acquires the memory allocation information from the process allocation memory management unit 202 (step S25). Then the process group termination possibility determination unit 205 shifts to a processing to confirm whether the process group rearranged in step S23 can be sequentially terminated.

Then the process group termination possibility determination unit 205 determines whether there are unselected processes in the process group (step S26). If it is determined that there are unselected processes (YES in step S26), the process group termination possibility determination unit 205 selects a first process of the unselected processes in the process group (step S27). Then the process group termination possibility determination unit 205 determines whether the selected process can be terminated based on the memory available capacity of all the plurality of memory blocks acquired in step S24, and the termination possibility determination conditions acquired in step S22 (step S28).

If it is determined that the selected process can be terminated (YES in step S28), the process group termination possibility determination unit 205 adds the memory allocation size of the selected process to the currently held value of the memory available capacity, and updates the memory available capacity (step S29). In this way, the process group termination possibility determination unit 205 stores the memory available capacity which changes when the selected process is terminated. The memory allocation size of the selected process can be acquired from the memory allocation information for each process acquired in step S25. Then processing returns to step S26, and the processing is continued in order to determine whether or not terminating is possible for the other processes of the process group.

If it is determined that the selected process cannot be terminated (NO in step S28), on the other hand, the process group termination possibility determination unit 205 stores information that the selected process cannot be terminated (step S30). Then the process group termination possibility determination unit 205 returns to the processing in step S26, and continues processing in order to determine whether terminating is possible for the other processes of the process group.

If it is determined that there is no unselected process in step S26 by determining whether terminating is possible for all of the processes of the process group acquired in step S21 (NO in step S26), the process group termination possibility determination unit 205 determines whether there is a process that cannot be terminated in the process group (step S31).

If it is determined that there is no process which cannot be terminated (NO in step S31), the process group termination possibility determination unit 205 notifies the termination candidate process selection unit 204 that there is no process that cannot be terminated (step S32). If it is determined that there is a process which cannot be terminated (YES in step S31), on the other hand, then the process group termination possibility determination unit 205 notifies the termination candidate process selection unit 204 with information on the process which cannot be terminated, and that there is a process that cannot be terminated (step S32).

By the above operation, the process group termination possibility determination unit 205 can prevent that a process with high priority is selected as a termination candidate out of the process group selected by the termination candidate process selection unit 204.

For example, it is assumed that the termination possibility determination conditions shown in the example in FIG. 7 are acquired in step S22, and the memory available capacity acquired in step S24 is 0.5 MB, and the process group acquired from the termination candidate process selection unit 204 is {second process B, third process C and first process A}. In this case, if the second process B is terminated first according to the selected sequence, the memory available capacity of all the plurality of memory blocks becomes 6.5 MB, since the total size of the memory area allocated to the second process B is 6 MB (memory allocation information 302 in FIG. 3). In this case, even if it is attempted to terminate the third process C and the first process A, only processes of which priority level is 3 or more can be terminated if based on the termination possibility determination conditions in FIG. 7, and the third process C of which priority level is 2 and the first process A of which priority level is 1 cannot be terminated.

However in step S23, the process group termination possibility determination unit 205 rearranges the process group, which is terminated in the sequence of {second process B, third process C and first process A} based on the termination possibility determination conditions shown in FIG. 7 to the sequence of {first process A, third process C and second process B}. In this case, the current memory available capacity is 0.5 MB, so only the process of which level is 1 or more can be terminated based on the termination possibility determination conditions in FIG. 7, and it can be determined that the first process A can be terminated in step S28.

The total size of the memory areas allocated to the first process A is 3 MB (memory allocation information 301 in FIG. 3), so the memory available capacity of all the plurality of memory blocks in step S29 is 3.5 MB. Since the memory available capacity of all the plurality of memory blocks is 3.5 MB, a process of which level is 2 or more can be terminated based on the termination possibility determination conditions in FIG. 7, and therefore it can be determined that the third process C to be selected next can be terminated.

Finally the total size of the memory areas allocated to the third process C is 4 MB (memory allocation information 303 in FIG. 3), so the memory available capacity of all the plurality of memory blocks in step S29 is 7.5 MB. Since the memory available capacity of all the plurality of memory blocks is 7.5 MB, a process of which level is 3 or more can be terminated based on the termination possibility determination conditions in FIG. 7, and therefore it can be determined that the second process B to be selected next can be terminated.

As the above example shows, only the second process B can be terminated in the process group {second process B, third process C and first process A} selected by the termination candidate process selection unit 204. However all the processes can be terminated by rearranging the sequence in the process group based on the termination possibility determination conditions by the operation of the process group termination possibility determination unit 205.

Figure 10:
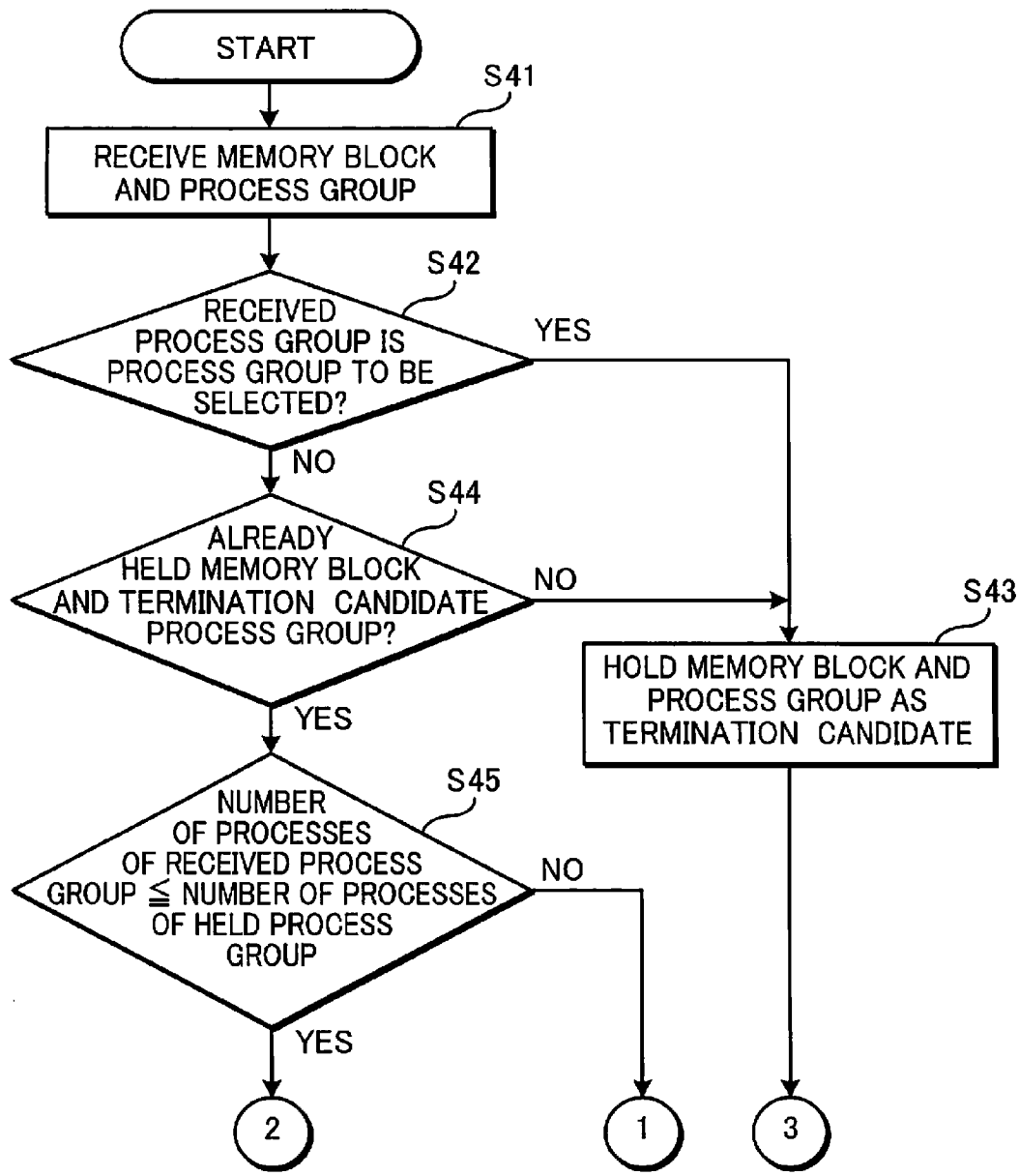
FIG. 10 is a first flow chart depicting an example of the processing by a termination process decision unit according to an embodiment of the present invention.
Figure 11:
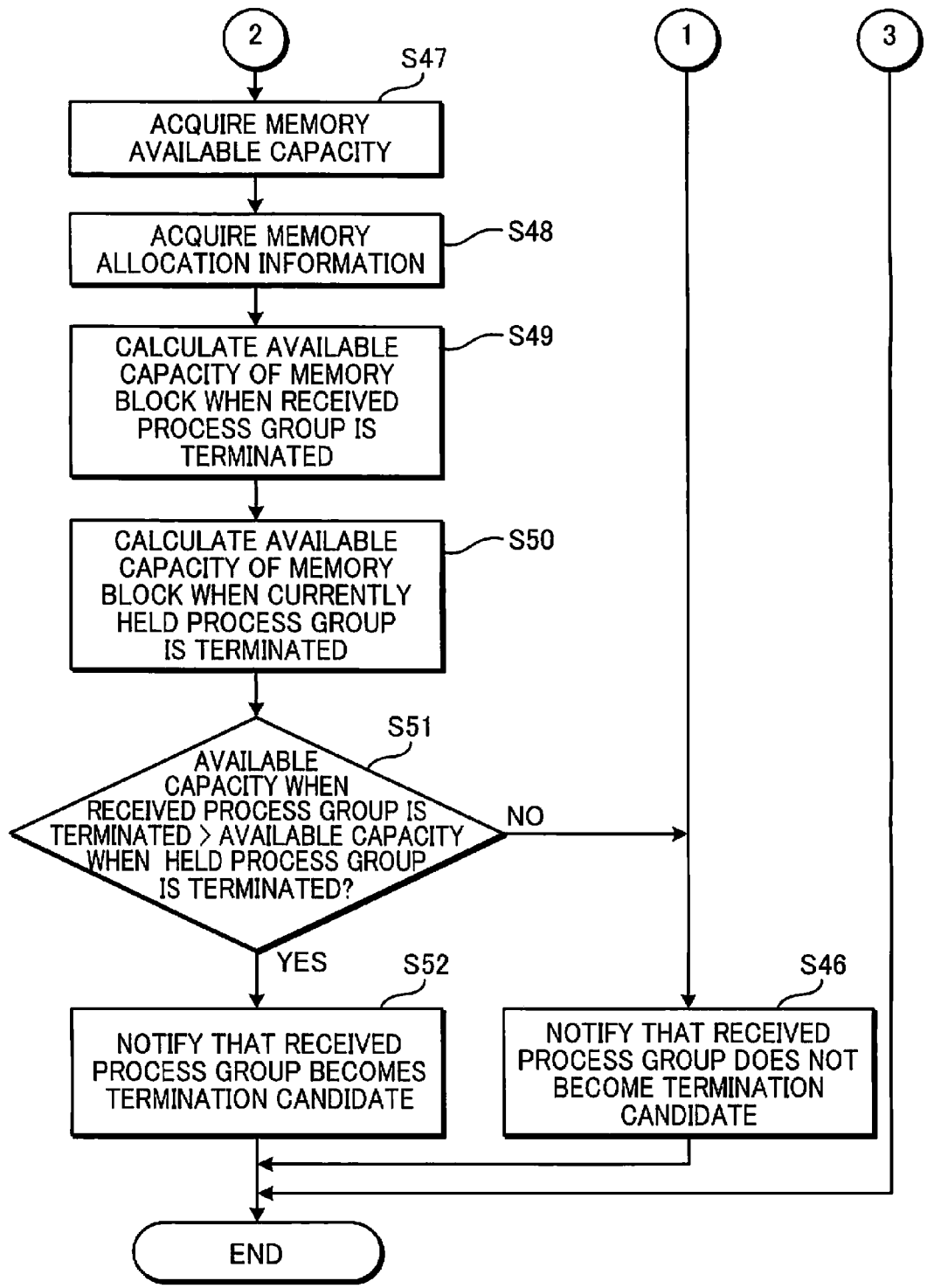
FIG. 11 is a second flow chart depicting an example of the processing by the termination process decision unit according to the embodiment of the present invention.

Now processing of the termination process decision unit 206 will be described. FIG. 10 and FIG. 11 are flow charts depicting an example of the processing by the termination process decision unit according to an embodiment of the present invention.

First the termination process decision unit 206 receives the information to indicate the selected memory block and the information to indicate the selected process group from the termination candidate process selection unit 204 (step S31). If a notice to indicate that the selection is determined is attached in step S12 in FIG. 6, the termination process decision unit 206 receives the information to indicate the selected memory block, the information to indicate the selected process group, and the notice to indicate that the selection is determined, from the termination candidate process selection unit 204.

If the notice that the selection is determined is notified from the termination candidate process selection unit 204, it is determined that the process group, which is transmitted with this notice, is to be terminated with priority over the process group currently being held by the termination process decision unit 206. Therefore the termination process decision unit 206 determines whether the received process group is the process group of which selection is determined (step S42). If it is determined that the received process group is the process group of which selection is determined (YES in step S42), the termination process decision unit 206 holds the memory block and the process group received from the termination candidate process selection unit 204 as the termination candidate (step S43).

If it is determined that the received process group is not the process group of which selection is determined (NO in step S42), the termination process decision unit 206 determines whether the memory block and the termination candidate process group are held (step S44). If it is determined that the memory block and the termination candidate process group are not held (NO in step S44), a process group to be compared with does not exist, so the termination process decision unit 206 holds the memory block and the process group received from the termination candidate process selection unit 204 as the termination candidate (step S43).

If it is determined that the memory block and the termination candidate process group are already held (YES in step S44), the termination process decision unit 206 determines whether or not the number of processes of the process group received from the termination candidate process selection unit 204 is the number of processes of the held process group or less (step S45). If it is determined that the number of processes of the process group received from the termination candidate process selection unit 204 is not the number of processes of the held process group or less, that is, if the number of processes of the received process group is greater than the number of processes of the held process group (NO in step S45), then the termination process decision unit 206 notifies the termination candidate process selection unit 204 that the received process group does not become the termination candidate (step S46).

If it is determined that the number of processes of the process group received from the termination candidate process selection unit 204 is the number of processes of the held process group or less (YES in step S45), on the other hand, the termination process decision unit 206 acquires available capacity of each memory block from the system memory management unit 203 (step S47).

Then the termination process decision unit 206 acquires the memory allocation information of each process from the process allocation memory management unit 202 (step S48).

Then the termination process decision unit 206 calculates the available capacity of the corresponding memory block, which is secured when the process group received from the termination candidate process selection unit 204 is terminated, based on the information acquired in step S47 and step S48 (step S49).

In concrete terms, the termination process decision unit 206 calculates the allocation size of each process of the process group received from the termination candidate process selection unit 204 for the memory block received from the termination candidate process selection unit 204 based on the memory allocation information acquired in step S48. The termination process decision unit 206 calculates the available capacity of the memory block received from the termination candidate process selection unit 204 based on the memory available capacity of each memory block acquired in step S47. The termination process decision unit 206 totals the memory available capacity of the memory block received from the termination candidate process selection unit 204 and the allocation size to the memory block of each process of the process group received from the termination candidate process selection unit 204, whereby the available capacity of the corresponding memory block, which can be secured in the case when the process group received from the termination candidate process selection unit 204 is terminated, can be calculated.

Now an example of calculating the available capacity of the memory block that can be secured when the process group received from the termination candidate process selection unit 204 is terminated will be described with reference to FIG. 3 and FIG. 4. For example, it is assumed that the memory block received from the termination candidate process selection unit 204 in step S41 in FIG. 10 is the second memory block, and the process group received from the termination candidate process selection unit 204 is the first process A and the third process C.

In this case, according to the example of the memory allocation information of the process allocation memory management unit 202 in FIG. 3, 3 MB is allocated to the second memory block of the first process A, and 1 MB is allocated to the second memory block of the third process C. According to the example of the memory available capacity information of the system memory management unit 203 in FIG. 4, the memory available capacity in the second memory block is 1 MB. Therefore the available capacity of the memory block (second memory block) that can be secured when the process group received from the termination candidate process selection unit 204 (the first process A and the third process C) is terminated totals 5 MB.

Then the termination process decision unit 206 calculates the available capacity of the memory block that can be secured when the currently held process group as the termination candidate is terminated (step S50). The procedure to calculate the available capacity is the same as the procedure executed in step S49. The memory block handled in step S50 is a memory block received from the termination candidate process selection unit 204 upon receiving the currently held processing group as the termination candidate, and is different from the memory block handled in step S49.

Now an example of calculating the available capacity of the memory block that can be secured when the currently held process group as the termination candidate is terminated will be described with reference to FIG. 3 and FIG. 4. For example, it is assumed that the currently held memory block is the first memory block, and the currently held process group is the third process C and the second process B.

In this case, according to the example of the memory allocation information of the process allocation memory management unit 202 in FIG. 3, 3 MB is allocated to the first memory block of the third process C, and 1 MB is allocated to the first memory block of the second process B. According to the example of the memory available capacity information of the system memory management unit 203 in FIG. 4, the memory available capacity in the first memory block is 2 MB. Therefore the available capacity of the memory block (first memory block) that can be secured when the currently held process group as the termination candidate (third process C and second process B) is terminated totals 6 MB.

Then the termination process decision unit 206 determines whether or not the available capacity that can be secured when the process group received from the termination candidate process selection unit 204 is terminated is greater than the available capacity that can be secured when the held termination candidate process group is terminated (step S51). In the case of the above mentioned example, if the process group received from the termination candidate process selection unit 204 is terminated, the available capacity of the second memory block becomes 5 MB, and if the currently held process group is terminated, the available capacity of the first memory block becomes 6 MB. Therefore the available capacity that can be secured when the held process group is terminated is greater than the available capacity that can be secured when the received process group is terminated.

If it is determined that the available capacity that can be secured when the process group received from the termination candidate process selection unit 204 is terminated is the available capacity that can be secured when the held termination candidate process group is terminated or less (NO in step S51), the termination process decision unit 206 notifies the termination candidate process selection unit 204 that the received process group does not become a termination candidate (step S46).

If it is determined that the available capacity that can be secured when the process group received from the termination candidate process selection unit 204 is terminated is greater than the available capacity that can be secured when the held termination candidate process group is terminated (YES in step S51), on the other hand, the termination process decision unit 206 notifies the termination candidate process selection unit 204 that the received process group becomes the termination candidate (step S52).

By the above operation, the termination process decision unit 206 can hold a specific memory block with which a maximum areas can be released, out of the plurality of memory blocks received from the termination candidate process selection unit 204. The termination process decision unit 206 also can hold a termination candidate process group with which a maximum areas of a specific block can be released.

Figure 12:
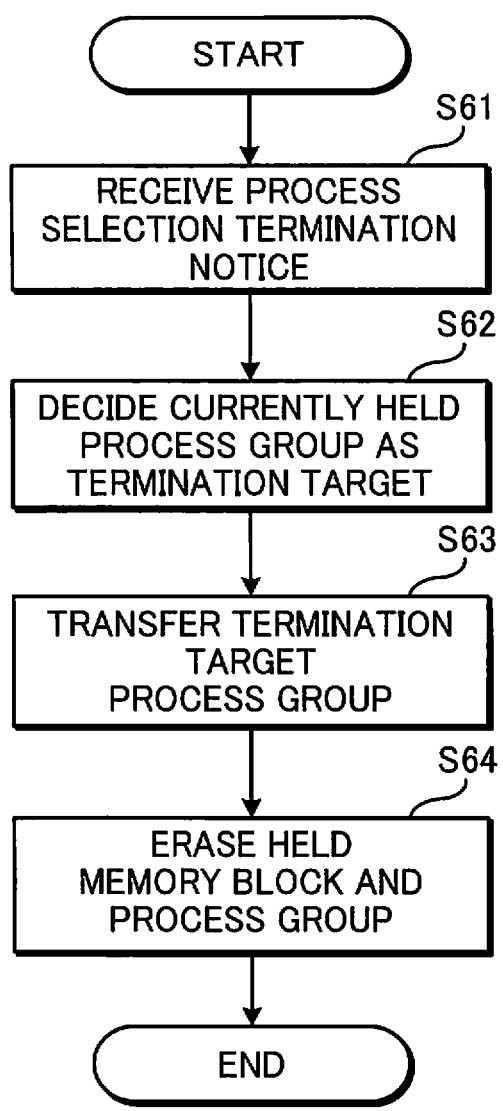
FIG. 12 is a flow chart depicting an example of the processing by the termination process decision unit when a process selection termination notice is received from the termination candidate process selection unit.

Now the processing by the termination process decision unit 206, when the process selection termination notice is received from the termination candidate process selection unit 204, will be described. FIG. 12 is a flow chart depicting an example of the termination process decision unit when the process selection termination notice is received from the termination candidate process selection unit.

First the termination process decision unit 206 receives the process selection termination notice which indicates that the termination candidate process selection terminated, from the termination candidate process selection unit 204 (step S61). Then the termination process decision unit 206 decides the currently held process group as the termination target process group (step S62). Then the termination process decision unit 206 transfers the decided termination target process group to the selected process termination unit 207 (step S63).

When the termination target process group is received from the termination process decision unit 206, the selected process termination unit 207 releases the memory blocks each process is using, and various resources secured by each process, by taking a procedure predetermined by the information process system, and terminates each termination target process.

Then the termination process decision unit 206 erases the currently held memory block and process group (step S64), and ends the processing.

By this operation, the memory management device of the present embodiment can create as many available areas as possible in a specific memory block, hence cost for saving data to shut OFF the power supplied to a specific memory block decreases, and entering the power saving state becomes easier.

Since as many available areas as possible can be created in a specific memory block, continuous available areas can be secured in the specific memory block. In the case of Codec which compresses or decompresses image data, it can use the continuous available areas of the specific memory block.

Each functional block of the memory management device shown in FIG. 2 is typically implemented as a program which is processed in tandem between the processor and an external memory, but may be implemented by an LSI, which is an integrated circuit. Each of these functional blocks may be integrated into one chip independently, or a part or all of these functional blocks may be integrated into one chip. Here the term LSI is used, but it may be referred to as an IC, system LSI, super LSI or ultra LSI, depending on the degree of integration.

A method for creating an integrated circuit is not limited to an LSI, but may be implemented by a dedicated circuit or general purpose processor. There may be used an FPGA (Field Programmable Gate Array) which is programmable after production of an LSI, or a reconfigurable processor constructed such that connection or setting of circuit cells in an LSI is reconfigurable.

If a technology for integrating circuits that replace LSI emerges due to advances in semiconductor technology or other derived technologies, the functional blocks may certainly be integrated using this technology.

The memory management device according to the present embodiment can be applied to various electronic apparatuses, information apparatuses, AV (Audio Visual) apparatuses, communication apparatuses and home electronic apparatuses, as long as such apparatuses are information processors having a processor and a memory device, and can be applied, for example, to a PC (Personal Computer), a portable information terminal (e.g. portable telephone, smart phone and PDA (Personal Digital Assistant)), a TV, a hard disk recorder, various disk recorders, such as a DVD or Blu-Ray disk, various disk players using a DVD or Blu-Ray disk, and car navigation systems.

The above description is just an example of the present invention in all aspects, and not for limiting the scope of the invention. Needless to say, numerous modifications and variations can be made without departing from the scope of the invention.

The above mentioned embodiments mainly include inventions having the following configurations.

A memory management device according to an aspect of the present invention is a memory management device for managing a memory which includes a plurality of memory blocks, comprising: a process allocation memory management unit which manages the allocation size of a plurality of memory blocks allocated to each of a plurality of processes used in an information processing system which is capable of executing the processes, in memory block units for each of the processes; a system memory management unit which manages a memory available capacity of all the plurality of memory blocks; a termination candidate process selection unit which, upon receiving a memory release request for releasing the memory from the information processing system, extracts a plurality of processes allocated to each of the plurality of memory blocks in descending order of the allocation size, based on the allocation size managed by the process allocation memory management unit, and selects the extracted plurality of processes as a termination candidate process group for each of the plurality of memory blocks; a preferential termination determination unit which determines whether or not the termination candidate process group selected by the termination candidate process selection unit is to be terminated with priority over a currently held termination candidate process group; a process group termination possibility determination unit which rearranges, according to the priority, the sequence in the termination candidate process group which has been selected by the termination candidate process selection unit and determined to be terminated with priority by the preferential termination determination unit, and which determines whether or not the rearranged termination candidate process group is capable of terminating based on the memory available capacity of all the plurality of memory blocks managed by the system memory management unit; and a termination process decision unit which rewrites the currently held termination candidate process group to the termination candidate process group determined to be able to be terminated by the process group termination possibility determination unit, and decides the currently held termination candidate process group as the process group to be terminated when selection of a termination candidate process group is ended for all the memory blocks.

A memory management method according to another aspect of the present invention is a memory management method for managing a memory which includes a plurality of memory blocks, comprising: a process allocation memory management step of managing the allocation size of a plurality of memory blocks allocated to each of a plurality of processes used in an information processing system which is capable of executing the processes, in memory block units for each of the processes; a system memory management step of managing a memory available capacity of all the plurality of memory blocks; a termination candidate process selection step of, upon receiving a memory release request for releasing the memory from the information processing system, extracting a plurality of processes allocated to each of the plurality of memory blocks in descending order of the allocation size, based on the allocation size managed in the process allocation memory management step, and selecting the extracted plurality of processes as a termination candidate process group for each of the plurality of memory blocks; a preferential termination determination step of determining whether or not the termination candidate process group selected in the termination candidate process selection step is to be terminated with priority over a currently held termination candidate process group; a process group termination possibility determination step of rearranging, according to the priority, the sequence in the termination candidate process group which has been selected in the termination candidate process selection step and determined to be terminated with priority in the preferential termination determination step, and determining whether or not the rearranged termination candidate process group is capable of terminating based on the memory available capacity of all the plurality of memory blocks managed in the system memory management step; and a termination process decision step of rewriting the currently held termination candidate process group to the termination candidate process group determined to be able to be terminated in the process group termination possibility determination step, and deciding the currently held termination candidate process group as the process group to be terminated when selection of a termination candidate process group is ended for all the memory blocks.

A memory management program according to another aspect of the present invention is a memory management program for managing a memory which includes a plurality of memory blocks, the memory management program causing a computer to function as: a process allocation memory management unit which manages the allocation size of a plurality of memory blocks allocated to each of a plurality of processes used in an information processing system which is capable of executing the processes, in memory block units for each of the processes; a system memory management unit which manages a memory available capacity of all the plurality of memory blocks; a termination candidate process selection unit which, upon receiving a memory release request for releasing the memory from the information processing system, extracts a plurality of processes allocated to each of the plurality of memory blocks in descending order of the allocation size, based on the allocation size managed by the process allocation memory management unit, and selects the extracted plurality of processes as a termination candidate process group for each of the plurality of memory blocks; a preferential termination determination unit which determines whether or not the termination candidate process group selected by the termination candidate process selection unit is to be terminated with priority over a currently held termination candidate process group; a process group termination possibility determination unit which rearranges, according to the priority, the sequence in the termination candidate process group which has been selected by the termination candidate process selection unit and determined to be terminated with priority by the preferential termination determination unit, and which determines whether or not the rearranged candidate process group is capable of terminating based on the memory available capacity of all the plurality of memory blocks managed by the system memory management unit; and a termination process decision unit which rewrites the currently held termination candidate process group to the termination candidate process group determined to be able to be terminated by the process group termination possibility determination unit, and decides the currently held termination candidate process group as the process group to be terminated when selection of a termination candidate process group is ended for all the memory blocks.

A computer-readable recording media recording a memory management program according to another aspect of the present invention is a computer-readable recording media recording a memory management program for managing a memory which includes a plurality of memory blocks, the memory management program causing a computer to function as: a process allocation memory management unit which manages the allocation size of a plurality of memory blocks allocated to each of a plurality of processes used in an information processing system which is capable of executing the processes, in memory block units for each of the processes; a system memory management unit which manages a memory available capacity of all the plurality of memory blocks; a termination candidate process selection unit which, upon receiving a memory release request for releasing the memory from the information processing system, extracts a plurality of processes allocated to each of the plurality of memory blocks in descending order of the allocation size, based on the allocation size managed by the process allocation memory management unit, and selects the extracted plurality of processes as a termination candidate process group for each of the plurality of memory blocks; a preferential termination determination unit which determines whether or not the termination candidate process group selected by the termination candidate process selection unit is to be terminated with priority over a currently held termination candidate process group; a process group termination possibility determination unit which rearranges, according to the priority, the sequence in the termination candidate process group which has been selected by the termination candidate process selection unit and determined to be terminated with priority by the preferential termination determination unit, and which determines whether or not the rearranged termination candidate process group is capable of terminating based on the memory available capacity of all the plurality of memory blocks managed by the system memory management unit; and a termination process decision unit which rewrites the currently held termination candidate process group to the termination candidate process group determined to be able to be terminated by the process group termination possibility determination unit, and decides the currently held termination candidate process group as the process group to be terminated when selection of a termination candidate process group is ended for all the memory blocks.

An integrated circuit according to another aspect of the present invention is an integrated circuit for managing a memory which includes a plurality of memory blocks, comprising: a process allocation memory management circuit which manages the allocation size of a plurality of memory blocks allocated to each of a plurality of processes used in an information processing system which is capable of executing the processes, in memory block units for each of the processes; a system memory management circuit which manages a memory available capacity of all the plurality of memory blocks; a termination candidate process selection circuit which, upon receiving a memory release request for releasing the memory from the information processing system, extracts a plurality of processes allocated to each of the plurality of memory blocks in descending order of the allocation size, based on the allocation size managed by the process allocation memory management circuit, and selects the extracted plurality of processes as a termination candidate process group for each of the plurality of memory blocks; a preferential termination determination circuit which determines whether or not the termination candidate process group selected by the termination candidate process selection circuit is to be terminated with priority over a currently held termination candidate process group; a process group termination possibility determination circuit which rearranges, according to the priority, the sequence in the termination candidate process group which has been selected by the termination candidate process selection circuit and determined to be terminated with priority by the preferential termination determination circuit, and which determines whether or not the rearranged termination candidate process group is capable of terminating based on the memory available capacity of all the plurality of memory blocks managed by the system memory management circuit; and a termination process decision circuit which rewrites the currently held termination candidate process group to the termination candidate process group determined to be able to be terminated by the process group termination possibility determination circuit, and decides the currently held termination candidate process group as the process group to be terminated when selection of a termination candidate process group is ended for all the memory blocks.

According to this configuration, an allocation size of a plurality of memory blocks allocated to a process used in an information processing system, which is capable of executing a plurality of processes, is managed in memory block units for each process. Also the memory available capacity of all the plurality of memory blocks is managed. When a memory release request for releasing the memory is received from the information processing system, a plurality of processes allocated for each of the plurality of memory blocks are extracted in descending order of the allocated size, based on the managed allocation size, and the extracted plurality of processes are selected as a termination candidate process group for each of the plurality of memory blocks. Then it is determined whether or not the selected termination candidate process group is to be terminated with priority over a currently held termination candidate process group. The sequence in the termination candidate process group determined to be terminated with priority is rearranged according to the priority, and it is determined whether or not the rearranged termination candidate process group is capable of terminating based on the memory available capacity of all the plurality of memory blocks being managed. When the process group of currently held termination candidate is rewritten to the termination candidate process group determined to be able to be terminated and selection of a termination candidate process group is ended for all the memory blocks, the currently held termination candidate process group is determined as a process group to be terminated.

Therefore a termination candidate process group is selected for each of the plurality of memory blocks, whether or not the selected termination candidate process group can be terminated is determined, and the process group which is determined to be able to be terminated is terminated, hence available capacity of a specific memory block can be secured as much as possible.

In the memory management device, it is preferable that the preferential termination determination unit determines whether or not the termination candidate process group selected by the termination candidate process selection unit is to be terminated with priority over a currently held termination candidate process group, based on a size relationship between the available capacity of the memory block that is capable of securing by terminating the termination candidate process group selected by the termination candidate process selection unit and the available capacity of the memory block that is capable of securing by terminating the currently held termination candidate process group.

According to this configuration, based on a size relationship between the available capacity of the memory block that is capable of securing by terminating the selected termination candidate process group, and the available capacity of the memory block that is capable of securing by terminating the currently held termination candidate process group, it is determined whether or not the selected termination candidate process group is to be terminated with priority over a currently held termination candidate process group.

Therefore by determining the size relationship between the available capacity of the memory block that is capable of securing by terminating the selected termination candidate process group, and the available capacity of the memory block that is capable of securing by terminating the currently held termination candidate process group, it can be decided which one of the process group of the selected termination candidate and the currently held termination candidate process group is to be terminated with priority.

In the memory management device, it is preferable that the preferential termination determination unit determines whether or not the termination candidate process group selected by the termination candidate process selection unit is to be terminated with priority over a currently held termination candidate process group, based on a size relationship between the number of processes of a plurality of processes constituting the termination candidate process group selected by the termination candidate process selection unit and the number of processes of a plurality of processes constituting the currently held termination candidate process group.

According to this configuration, depending on the size relationship between the number of processes of a plurality of processes constituting the selected termination candidate process group and the number of processes of a plurality of processes constituting the currently held termination candidate process group, it is determined whether the selected termination candidate process group is to be terminated with priority over a currently held termination candidate process group.

Therefore by determining the size relationship between the number of processes of a plurality of processes constituting the selected termination candidate process group and the number of processes of a plurality of processes constituting the currently held termination candidate process group, it can be decided which one of the selected termination candidate process group and the currently held termination candidate process group is to be terminated with priority.

In the memory management device, it is desirable that the process group termination possibility determination unit rearranges the plurality of processes constituting the termination candidate process group selected by the termination candidate process selection unit, based on a priority level which is set in advance for each process.

According to this configuration, the plurality of processes constituting the selected termination candidate process group is rearranged based on the priority level which is set in advance for each process, hence the sequence in the termination candidate process group can be rearranged according to the priority level.

In the memory management device, it is preferable that power is supplied individually to the plurality of memory blocks.

According to this configuration, power is supplied individually to the plurality of memory blocks, so power saving can be implemented by interrupting power supplied to a memory block of which available capacity is largest.

Embodiments or examples carried out in the "Description of Embodiments" section are merely for clarifying the technical content of the present invention, and can be modified in various ways within the scope of the spirit of the present invention and Claims, without being narrowly interpreted, limiting the present invention to such embodiments.

Industrial Applicability

The memory management device, the memory management method, the memory management program, the computer-readable recording medium recording the memory management program, and the integrated circuit according to the present invention can secure available capacity of a specific memory block as much as possible, and are effective as a memory management device for managing a memory which includes a plurality of memory blocks, a memory management method, a memory management program, a computer-readable recording medium recording the memory management program, and an integrated circuit.

The invention claimed is:

1. A memory management device for managing a memory which includes a plurality of memory blocks, comprising:
   a process allocation memory management unit which manages the allocation size of a plurality of memory blocks allocated to each of a plurality of processes used in an information processing system which is capable of executing the processes, in memory block units for each of the processes;
   a system memory management unit which manages a memory available capacity of all the plurality of memory blocks;
   a termination candidate process selection unit which, upon receiving a memory release request for releasing the memory from the information processing system, extracts a plurality of processes allocated to each of the plurality of memory blocks in descending order of the allocation size, based on the allocation size managed by the process allocation memory management unit, and selects the extracted plurality of processes as a termination candidate process group for each of the plurality of memory blocks;
   a preferential termination determination unit which determines whether or not the termination candidate process group selected by the termination candidate process selection unit is to be terminated with priority over a currently held termination candidate process group;
   a process group termination possibility determination unit which rearranges, according to the priority, the sequence in the termination candidate process group which has been selected by the termination candidate process selection unit and determined to be terminated with priority by the preferential termination determination unit, and which determines whether or not the rearranged termination candidate process group is capable of terminating based on the memory available capacity of all the plurality of memory blocks managed by the system memory management unit; and
   a termination process decision unit which rewrites the currently held termination candidate process group to the termination candidate process group determined to be able to be terminated by the process group termination possibility determination unit, and decides the currently held termination candidate process group as the process group to be terminated when selection of a termination candidate process group is ended for all the memory blocks.

2. The memory management device according to claim 1, wherein
   the preferential termination determination unit determines whether or not the termination candidate process group selected by the termination candidate process selection unit is to be terminated with priority over a currently held termination candidate process group, based on a size relationship between the available capacity of the memory block that is capable of securing by terminating the termination candidate process group selected by the termination candidate process selection unit and the available capacity of the memory block that is capable of securing by terminating the currently held termination candidate process group.

3. The memory management device according to claim 1, wherein
   the preferential termination determination unit determines whether or not the termination candidate process group selected by the termination candidate process selection unit is to be terminated with priority over a currently held termination candidate process group, based on a size relationship between the number of processes of a plurality of processes constituting the termination candidate process group selected by the termination candidate process selection unit and the number of processes of a plurality of processes constituting the currently held termination candidate process group.

4. The memory management device according to claim 1, wherein
   the process group termination possibility determination unit rearranges the plurality of processes constituting the termination candidate process group selected by the termination candidate process selection unit, based on a priority level which is set in advance for each process.

5. The memory management device according to claim 1, wherein power is supplied individually to the plurality of memory blocks.

6. A memory management method for managing a memory which includes a plurality of memory blocks, comprising:
   a process allocation memory management step of managing the allocation size of a plurality of memory blocks allocated to each of a plurality of processes used in an information processing system which is capable of executing the processes, in memory block units for each of the processes;
   a system memory management step of managing a memory available capacity of all the plurality of memory blocks;
   a termination candidate process selection step of, upon receiving a memory release request for releasing the memory from the information processing system, extracting a plurality of processes allocated to each of the plurality of memory blocks in descending order of the allocation size, based on the allocation size managed in the process allocation memory management step, and selecting the extracted plurality of processes as a termination candidate process group for each of the plurality of memory blocks;
   a preferential termination determination step of determining whether or not the termination candidate process group selected in the termination candidate process selection step is to be terminated with priority over a currently held termination candidate process group;
   a process group termination possibility determination step of rearranging, according to the priority, the sequence in the termination candidate process group which has been selected in the termination candidate process selection step and determined to be terminated with priority in the preferential termination determination step, and determining whether or not the rearranged termination candidate process group is capable of terminating based on the memory available capacity of all the plurality of memory blocks managed in the system memory management step; and a termination process decision step of rewriting the currently held termination candidate process group to the termination candidate process group determined to be able to be terminated in the process group termination possibility determination step, and deciding the currently held termination candidate process group as the process group to be terminated when selection of a termination candidate process group is ended for all the memory blocks.

7. A non-transitory computer-readable recording medium recording a memory management program for managing a memory which includes a plurality of memory blocks, the memory management program causing a computer to function as at least:

a process allocation memory management unit which manages the allocation size of a plurality of memory blocks allocated to each of a plurality of processes used in an information processing system which is capable of executing the processes, in memory block units for each of the processes;

a system memory management unit which manages a memory available capacity of all the plurality of memory blocks;

a termination candidate process selection unit which, upon receiving a memory release request for releasing the memory from the information processing system, extracts a plurality of processes allocated to each of the plurality of memory blocks in descending order of the allocation size, based on the allocation size managed by the process allocation memory management unit, and selects the extracted plurality of processes as a termination candidate process group for each of the plurality of memory blocks;

a preferential termination determination unit which determines whether or not the termination candidate process group selected by the termination candidate process selection unit is to be terminated with priority over a currently held termination candidate process group;

a process group termination possibility determination unit which rearranges, according to the priority, the sequence in the termination candidate process group which has been selected by the termination candidate process selection unit and determined to be terminated with priority by the preferential termination determination unit, and which determines whether or not the rearranged termination candidate process group is capable of terminating based on the memory available capacity of all the plurality of memory blocks managed by the system memory management unit; and a termination process decision unit which rewrites the currently held termination candidate process group to the termination candidate process group determined to be able to be terminated by the process group termination possibility determination unit, and decides the currently held termination candidate process group as the process group to be terminated when selection of a termination candidate process group is ended for all the memory blocks.

8. An integrated circuit for managing a memory which includes a plurality of memory blocks, comprising:

a process allocation memory management circuit which manages the allocation size of a plurality of memory blocks allocated to each of a plurality of processes used in an information processing system which is capable of executing the processes, in memory block units for each of the processes;

a system memory management circuit which manages a memory available capacity of all the plurality of memory blocks;

a termination candidate process selection circuit which, upon receiving a memory release request for releasing the memory from the information processing system, extracts a plurality of processes allocated to each of the plurality of memory blocks in descending order of the allocation size, based on the allocation size managed by the process allocation memory management circuit, and selects the extracted plurality of processes as a termination candidate process group for each of the plurality of memory blocks;

a preferential termination determination circuit which determines whether or not the termination candidate process group selected by the termination candidate process selection circuit is to be terminated with priority over a currently held termination candidate process group;

a process group termination possibility determination circuit which rearranges, according to the priority, the sequence in the termination candidate process group which has been selected by the termination candidate process selection circuit and determined to be terminated with priority by the preferential termination determination circuit, and which determines whether or not the rearranged termination candidate process group is capable of terminating based on the memory available capacity of all the plurality of memory blocks managed by the system memory management circuit; and a termination process decision circuit which rewrites the currently held termination candidate process group to the termination candidate process group determined to be able to be terminated by the process group termination possibility determination circuit, and decides the currently held termination candidate process group as the process group to be terminated when selection of a termination candidate process group is ended for all the memory blocks.

\* \* \* \* \*